US012304366B2

(12) United States Patent
Tachikawa et al.

(10) Patent No.: US 12,304,366 B2
(45) Date of Patent: May 20, 2025

(54) VEHICLE SEAT AND VEHICLE SEAT MANUFACTURING METHOD

(71) Applicant: TS TECH CO., LTD., Asaka (JP)

(72) Inventors: Yoichi Tachikawa, Tochigi (JP); Kohei Taguchi, Tochigi (JP); Tsukasa Meguro, Tochigi (JP); Yoshihiro Tomita, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 92 days.

(21) Appl. No.: 17/926,752

(22) PCT Filed: May 21, 2021

(86) PCT No.: PCT/JP2021/019457
§ 371 (c)(1),
(2) Date: Nov. 21, 2022

(87) PCT Pub. No.: WO2021/235552
PCT Pub. Date: Nov. 25, 2021

(65) Prior Publication Data
US 2023/0202355 A1 Jun. 29, 2023

Related U.S. Application Data

(60) Provisional application No. 63/200,801, filed on Mar. 30, 2021, provisional application No. 62/704,667, filed on May 21, 2020.

(30) Foreign Application Priority Data

Dec. 28, 2020 (JP) ................................. 2020-218452
Mar. 4, 2021 (JP) ................................. 2021-034523
Mar. 18, 2021 (JP) ................................. 2021-045015

(51) Int. Cl.
B60N 2/20 (2006.01)
B60N 2/00 (2006.01)
B60N 2/02 (2006.01)

(52) U.S. Cl.
CPC ............. *B60N 2/20* (2013.01); *B60N 2/0033* (2023.08); *B60N 2/0031* (2023.08);
(Continued)

(58) Field of Classification Search
CPC .............. A47C 3/0251; A47C 1/02452; A47C 1/03211; B60N 2/68–688; B60N 2/20;
(Continued)

(56) References Cited

U.S. PATENT DOCUMENTS 5,957,531 A 9/1999 Kane et al.
6,000,757 A 12/1999 Sovis
(Continued)

FOREIGN PATENT DOCUMENTS

JP 10-502888 A 3/1998
JP 2003-522620 A 7/2003
(Continued)

OTHER PUBLICATIONS

PCT International Search Report (w/ English translation) and Written Opinion for corresponding PCT Application No. PCT/JP2021/019457, mailed on Aug. 17, 2021—10 pages.
(Continued)

*Primary Examiner* — Syed A Islam
(74) *Attorney, Agent, or Firm* — Dority & Manning, P.A.

(57) ABSTRACT

A vehicle seat includes a base provided on a floor; a seat back pivotably provided on the base; a seat cushion pivotably provided on the seat back; and a reclining drive unit connected to the base and the seat back to make the seat back
(Continued)

pivot relative to the base, wherein the reclining drive unit is disposed more rearward than a front end of the seat cushion.

11 Claims, 28 Drawing Sheets

(52) U.S. Cl.
CPC ...... *B60N 2/02258* (2023.08); *B60N 2210/42* (2023.08); *B60N 2210/48* (2023.08)

(58) Field of Classification Search
CPC ........ B60N 2/23; B60N 2/233; B60N 2/2231; B60N 2/00246
See application file for complete search history.

(56) References Cited

U.S. PATENT DOCUMENTS

| | | | | |
|---|---|---|---|---|
| 6,322,146 | B1 * | 11/2001 | Fisher, Jr. | .......... B60N 2/02246 |
| | | | | 74/606 R |
| 8,746,773 | B2 * | 6/2014 | Bruck | ...................... B60N 2/20 |
| | | | | 296/65.17 |
| 10,654,385 | B2 | 5/2020 | Onuma et al. | |
| 2010/0170354 | A1 | 7/2010 | Haraguchi et al. | |
| 2011/0272978 | A1 | 11/2011 | Nitsuma | |
| 2011/0278886 | A1 | 11/2011 | Nitsuma | |
| 2012/0139312 | A1 | 6/2012 | Kato et al. | |
| 2015/0291072 | A1 | 10/2015 | Ito | |

FOREIGN PATENT DOCUMENTS

| | | |
|---|---|---|
| JP | 2004-262294 A | 9/2004 |
| JP | 2009208555 A | 9/2009 |
| JP | 2010173436 A | 8/2010 |
| JP | 2014100943 A | 6/2014 |
| JP | 2016175615 A | 10/2016 |
| JP | 2018161913 A | 10/2018 |
| WO | WO2009/031225 A1 | 3/2009 |

OTHER PUBLICATIONS

Japanese Office Action (w/ English translation) for corresponding Application No. 2020-218452, dated Oct. 22, 2024, 10 pages.
Japanese Office Action (w/ English translation) for corresponding Application No. 2021-045015, dated Dec. 3, 2024, 12 pages.

* cited by examiner

Fig.15
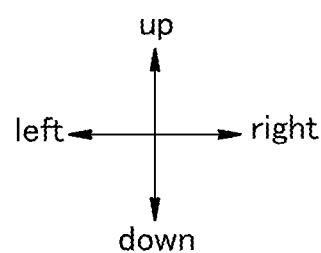
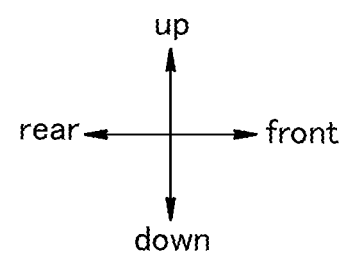
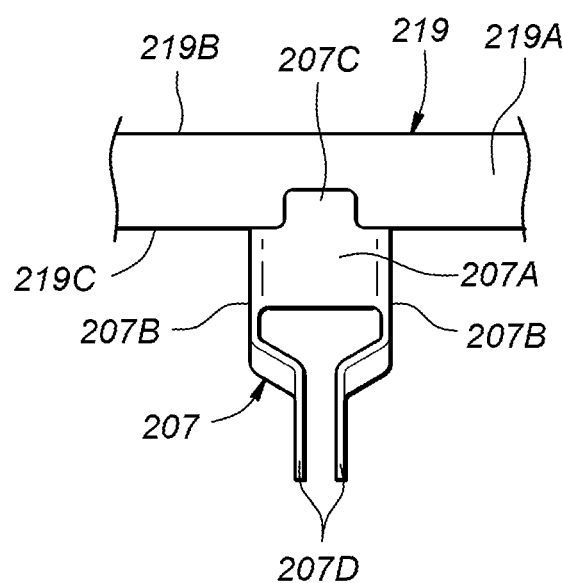
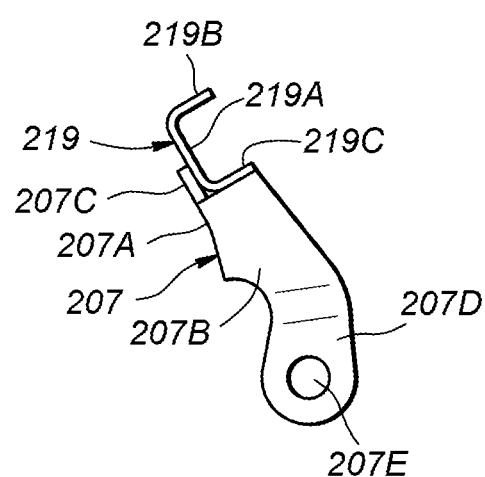
(A)　　　　　　　　　　　　(B)

Fig.23
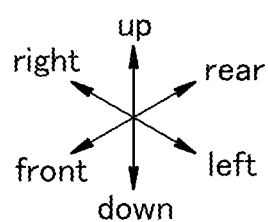
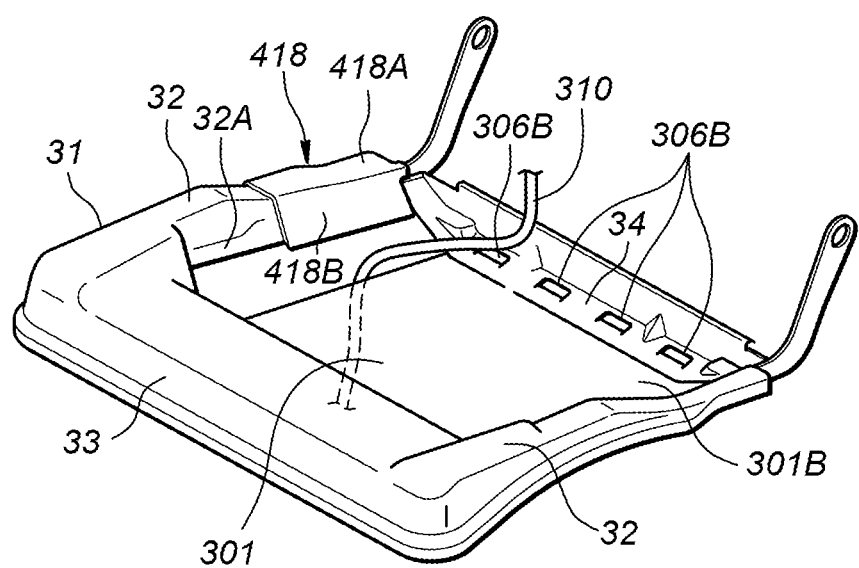

VEHICLE SEAT AND VEHICLE SEAT MANUFACTURING METHOD

CROSS REFERENCE TO RELATED APPLICATIONS

This application is the U.S. National Stage entry of International Application No. PCT/JP2021/019457 filed under the Patent Cooperation Treaty on May 21, 2021, which claims priority to U.S. Provisional Patent Application No. 62/704,667 filed on May 21, 2020, Japanese Patent Application No. 2020-218452 filed on Dec. 28, 2020, Japanese Patent Application No. 2021-034523 filed on Mar. 4, 2021, Japanese Patent Application No. 2021-045015 filed on Mar. 18, 2021, and U.S. Provisional Patent Application No. 63/200,801 filed on Mar. 30, 2021, all of which are incorporated herein by reference.

TECHNICAL FIELD

The present invention relates to a vehicle seat and a manufacturing method of a vehicle seat.

BACKGROUND ART

Patent Document 1 discloses a dive-down seat in which the seat cushion is moved toward the floor when the seat is in a stowed form. The seat cushion and the floor are connected by a front leg and a rear leg, and the seat cushion, the floor, and the front and rear legs form a four-joint link. The front leg and the floor are connected by a driving means including a screw rod that reciprocates under a driving force of an electric motor. Due to driving by the driving means, an angle of the front leg relative to the floor changes and the seat cushion moves. As a result, the seat changes from a use form to a stowed form.

PRIOR ART DOCUMENT(S)

Patent Document(s)

[Patent Document 1] JP2004-262294A

SUMMARY OF THE INVENTION

Task to be Accomplished by the Invention

In the seat of Patent Document 1, the driving means is provided on the floor in front of the front leg. Therefore, there is a problem that the space in front of the seat cushion is narrow. Also, since it is necessary to mount the driving means to the floor separately from the seat, there is a problem that the installation work of the seat is cumbersome.

In view of the foregoing background, an object of the present invention is to widen the space in front of the seat cushion of the vehicle seat. It is also an object of the present invention to make the installation work of the vehicle seat easy.

Means to Accomplish the Task

One aspect of the present invention is a vehicle seat (1, 200), comprising: a base (7) provided on a floor (4); a seat back (3) pivotably provided on the base (7); a seat cushion (2) pivotably provided on the seat back (3); and a reclining drive unit (61) connected to the base and the seat back (3) to make the seat back (3) pivot relative to the base (7), wherein the reclining drive unit (61) is disposed more rearward than a front end of the seat cushion (2).

According to this aspect, since the reclining drive unit is disposed more rearward than the front end of the seat cushion, it is possible to widen the space in front of the seat cushion. Also, since the reclining drive unit is connected to the base and the seat back, it is unnecessary to fix the reclining drive unit to the floor, and the installation work can be made easy.

In the above aspect, preferably, the base (7) includes left and right base side members (11) extending in a front-rear direction and a base cross member (13, 213) extending laterally and joined to the left and right base side members (11), and the reclining drive unit includes a case (61A) supported on the base cross member (13, 213), a nut (61B) rotatably supported on the case, a reclining electric motor (61D) joined to the case and generating a driving force for rotating the nut (61B), and a screw shaft (61C) that is threadingly engaged with the ball screw nut (61B), extends in the front-rear direction, and is pivotably connected to the seat back (3) at a rear end thereof.

According to this aspect, since the reclining drive unit is disposed on the base cross member provided between the left and right base side members, the seat back can be pivoted stably by a single reclining drive unit.

In the above aspect, preferably, the case (61A) is joined to the base cross member (13, 213) via a hinge.

According to this aspect, it is possible to make the ball screw shaft pivot in accordance with the angle of the seat back, and therefore, it is possible to make the seat back pivot efficiently.

In the above aspect, preferably, the base cross member (213) is formed of a pipe member having at least one bent part (214).

According to this aspect, it is possible to simplify the configuration of the base cross member while improving the stiffness.

In the above aspect, preferably, the seat back (3) includes left and right back side members (17) and a lower member (19) extending laterally and joined to the left and right back side members (17), and the rear end of the screw shaft (61C) is pivotably connected to the lower member (19).

According to this aspect, since the ball screw shaft is connected to the lower member disposed between the left and right back side members, the load from the ball screw shaft can be transmitted to the seat back stably.

In the above aspect, preferably, the left and right back side members (17) each include a plate-shaped main body (17A) having a laterally facing surface and an edge wall portion (17D) protruding laterally inward from an edge of the main body (17A), and the lower member (19) includes a first channel member (19A) having a groove-shaped cross section and welded to the edge wall portions (17D) at left and right end portions thereof.

According to this aspect, it is possible to improve the stiffness of the lower member. Therefore, the driving force from the reclining drive unit can be efficiently transmitted to the seat back.

In the above aspect, preferably, the lower member (19) includes a second channel member (19B) having a groove-shaped cross section, disposed inside the first channel member (19A), and joined to the first channel member (19A), and the rear end of the screw shaft (61C) is connected to the first channel member (19A) at a position corresponding to the second channel member (19B) in a lateral direction.

According to this aspect, it is possible to improve the stiffness of the part of the lower member to which the ball screw shaft is connected. Therefore, the driving force from the reclining drive unit can be efficiently transmitted to the seat back.

In the above aspect, preferably, the lower member (19) is provided with a bracket (217) that pivotably supports the screw shall (61C), and in a state in which the seat back (3) extends vertically, the bracket (217) extends downward and forward from the lower member (19) and supports, at a tip end portion thereof, the rear end of the screw shaft (61C) to be pivotable about a laterally extending axis.

According to this aspect, in the state in which the seat back extends horizontally, namely, in the stowed state of the seat, the bracket extends downward from the lower member, and therefore, the bracket and the rear end of the screw shaft are disposed lower than the rear surface of the seat back.

In the above aspect, preferably, the reclining electric motor (61D) is disposed more rearward than the base cross member (213).

According to this aspect, the distance from the seat back to the reclining electric motor and the nut can be made short and the ball screw shaft can be made short. Therefore, the reclining drive unit can be made compact.

In the above aspect, preferably, a rotation shaft of the reclining electric motor (61D) extends in a lateral direction, and in plan view, an axis of the screw shaft (61C) extends in the front-rear direction.

According to this aspect, the distance from the seat back to the reclining electric motor and the nut can be made short and the ball screw shaft can be made short. Therefore, the reclining drive unit can be made compact.

In the above aspect, preferably, the vehicle seat comprises: a lock device (5) that selectively restricts pivoting of the seat back (3) relative to the floor (4); a lock device drive unit (41) that is provided with a lock device electric motor (41A) and drives the lock device (5); and an electronic control unit (42) that controls the lock device electric motor (41A), wherein the seat back (3) includes a seat back fame (16 and the lock device drive unit (41) and the electronic control unit (42) are arranged in a vertical direction on one side of the seat back frame (16) in a lateral direction.

According to this aspect, the electronic control unit can be disposed at a position in the vehicle seat where it does not obstruct operation of the seat. Also, influence of the electronic control unit and the lock device electric motor on the back of the occupant can he reduced.

Another aspect of the present invention is a manufacturing method of a vehicle seat (1, 200), comprising: a step of providing a seat back (3) on a base (7) in a pivotable manner; a step of providing a seat cushion (2) on the seat hack (3) in a pivotable manner; and a step of connecting a reclining drive unit (61) for making the seat back (3) pivot relative to the base (7) to the base (7) and the seat back (3) such that the reclining drive unit is provided more rearward than a front end of the seal cushion (2).

According to this aspect, the vehicle seal provided with the reclining drive unit can be unitized. Therefore, installation of the vehicle seat to the vehicle becomes easy.

In another aspect of the present invention, preferably, the seat back frame (16) includes a plate member (24), the plate member (24) includes a planar part (24B) and multiple ridges (24C) protruding from the planar part (24B), the first bracket (44) is joined to at least one of the planar part (24B) and the ridges (24C) so as to overlap with the planar part (24B) and the ridges (24C) as seen in a direction perpendicular to the plate member (24), and the electronic control unit (42) is attached to the first bracket (44).

According to this aspect, it is possible to enhance the stability of the first bracket by disposing the first bracket on a part of the plate-shaped member having high stiffness.

In the above aspect, preferably, the seat back frame (16) includes left and right side members (17) extending vertically and joined to the plate member (24) and an upper member (18) extending laterally and joined to upper ends of the left and right side members (17), wherein the electronic control unit (42) is disposed in a corner defined by the upper member (18) and one of the left and right side members (17).

According to this aspect, the electronic control unit can be disposed by effectively using the space formed by the upper member, the side member, and the plate member. Also, influence of the electronic control unit on the back of the occupant can be reduced.

In the above aspect, preferably, the upper member (18) is provided with left and right headrest supporting parts (26) for supporting a headrest, and at least a part of the electronic control unit is disposed between the side member (17) and the headrest supporting part (26) that laterally correspond thereto.

According to this aspect, the electronic control unit can be disposed by effectively using the space formed by the side member and the headrest supporting part. Also, influence of the electronic control unit on the back of the occupant can be reduced.

In the above aspect, preferably, the lock device drive unit (41) is disposed below the electronic control unit (42).

According to this aspect, the electronic control unit and the lock device drive unit can be arranged in the seat back in a space-efficient manner.

In the above aspect, preferably, the seat back frame (16) includes a cross member (21) that extends laterally to pass between the lock device drive unit (41) and the electronic control unit (42) and is joined to the left and right side members (17).

According to this aspect, it is possible to improve the stiffness of a part of the seat back frame where the electronic control unit and the lock device drive unit are mounted.

In the above aspect, preferably, the electronic control unit (42) is disposed in a space defined by the side member (17) and the headrest supporting part (26) that laterally correspond thereto, the upper member (18), and the cross member (21).

According to this aspect, the electronic control unit can be disposed by effectively using the space formed by the upper member, the side member, the headrest supporting part, the cross member, and the plate member. Also, influence of the electronic control unit on the back of the occupant can be reduced.

In the above aspect, preferably, the lock device drive unit (41) is attached to a second bracket (46) joined to the side member (17), an end portion (21A) of the cross member is bent in a direction opposite from the second bracket (46) and is joined to the side member (17).

According to this aspect, the cross member can be joined to the side member while avoiding interference with the second bracket.

In the above aspect, preferably, the seat back (3) is pivotably joined to the base (7) provided on the floor (4) via the lock device (5), the seat cushion (2) is pivotably joined to the seat back (3), and the seat cushion (2) descends when the seat back (3) pivots forward.

According to this aspect, the seat can be stowed compactly. Also, since the electronic control unit is provided on the seat back, the seat cushion can be stowed compactly on the floor.

In the above aspect, preferably, lower ends of the left and right side members (17) are pivotably joined to the base (7) provided on the floor (4) via the lock device (5), the lock device (5) includes an operation shall (5A) extending along a pivot axis of the side members (17) and penetrating the side member (17) to protrude laterally inward of the side member (17) and permits or restricts rotation of the side member (17) relative to the floor (4) according to rotation of the operation shall (5A), an end portion of the operation shaft (5A) is provided with an operation lever (5B) that extends in a radial direction and is connected to the lock device drive unit (41) via a transmission member, and a lower end of the side member (17) is provided with a sensor (57) for detecting a position of the operation lever (5B).

According to this aspect, the state of the lock device can be detected by the sensor.

In the above aspect, preferably, the seat cushion (2) includes left and right links (37) pivotably supported on the left and right side members (17), and when the seat back (3) is in a seating position, the sensor (57) is disposed between the side member (17) and the link (37) that correspond thereto.

According to this aspect, it is possible to prevent the sensor from interfering with the link.

In the above aspect, preferably, the vehicle seat comprises: a lower member (19) extending laterally and joined to lower portions of the left and right side members (17); a reclining drive unit (61) provided on the base (7) to make the seat back frame pivot relative to the base (7), and a harness (67) connecting the electronic control unit (42) and the reclining drive unit (61), wherein a part of the harness (67) is supported on the lower member (19).

According to this aspect, the harness can be disposed stably.

Another aspect of the present invention is a vehicle seat (300, 400, 500) comprising a seat cushion (2) and a seat back (3), wherein the seat cushion (2) includes a seat cushion frame (31), a pad (307) supported on the seat cushion frame (31), and a skin member (308) covering the pad (307), the seat cushion frame (31) includes left and right side members (32) extending in a front-rear direction, a front member (33) extending laterally and joined to front portions of the left and right side members (32), and a rear member (34) extending laterally and joined to rear portions of the left and right side members (32), a flexible sheet-shaped member (301) extending in the front-rear direction and having a vertically facing surface is provided to span between the front member (33) and the rear member (34), at least a part of the pad (307) is supported on the sheet-shaped member (301) from below, and the pad (307) is provided with an occupant detection sensor (309).

According to this aspect, an occupant detection device can be disposed in the vehicle seat including the sheet-shaped member.

In the above aspect, preferably, the occupant detection sensor (309) is provided on an upper surface of the pad (307), and a harness (310) connected to the occupant detection sensor (309) extends from the occupant detection sensor (309) to below the sheet-shaped member (301) by passing through a first hole (307A) vertically penetrating the pad (307) and passing a second hole (312) vertically penetrating the sheet-shaped member (301).

According to this aspect, in the seat cushion including the sheet-shaped member, the harness extending from the occupant detection sensor can extend to below the sheet-shaped member.

In the above aspect, preferably, a grommet (314) is fitted on an edge part of the second hole (312).

According to this aspect, damage to the edge part of the second hole due to contact with the harness can be prevented.

In the above aspect, preferably, a support member (522) that has flexibility and supports the sheet-shaped member (301) from below is provided between the front member (33) and the rear member (34), and the harness (310) extends from the occupant detection sensor (309) to below the support member (522) by passing through a third hole (313) provided in the support member (522).

According to this aspect, in the seat cushion including the support member that supports the sheet-shaped member, the harness extending from the occupant detection sensor can extend to below the sheet-shaped member.

In the above aspect, preferably, the occupant detection sensor (309) is provided on an upper surface of the pad (307), and a harness (310) connected to the occupant detection sensor (309) extends from the occupant detection sensor (32) to below the sheet-shaped member (301) by passing through a first hole (311) vertically penetrating the pad (307) and passing through a gap between the sheet-shaped member (301) and the side member (32).

According to this aspect, in the seat cushion including the sheet-shaped member, the harness extending from the occupant detection sensor can extend to below the sheet-shaped member.

In the above aspect, preferably, a cover (418) made of resin is fitted on the side member (33), and the harness (310) extends from the occupant detection sensor (309) to below the sheet-shaped member (301) by passing a gap between the sheet-shaped member (301) and the cover (418).

According to this aspect, contact between the harness and the side member can be avoided, and wear of the harness can be suppressed.

In the above aspect, preferably, the seat back (3) pivots between a use position in which the seat back extends upward from a rear portion of the seat cushion (2) and a stowed position to which the seat back pivots forward from the use position to overlap with an upper side of the seat cushion (2), at least one of the seat cushion (2) and the seat back (3) is provided with a restricting part (315) that restricts a position of the seat back (3) in the stowed position relative to the seat cushion (2), the restricting part (315) suppressing a load imparted on the occupant detection sensor (309) from the seat back (3) to be less than or equal to a predetermined value when the seat back (3) is in the stowed position.

According to this aspect, when the seat back is in the stowed position, it is possible to prevent erroneous detection due to pressing of the occupant detection sensor by the seat back.

In the above aspect, preferably, the seat back (3) includes left and right side supporting parts (316) protruding forward from left and right side portions in the use position, and the restricting part (315) includes the side supporting parts (316).

According to this aspect, the load applied to the occupant detection sensor from the seat back can be suppressed by using the side supporting parts.

In the above aspect, preferably, the seat back (3) is provided with a headrest (317), and the restricting part (315) includes the headrest (317).

According to this aspect, the load applied to the occupant detection sensor from the seat back can be suppressed by using the headrest.

In the above aspect, preferably, the seat back (3) is pivotably supported on the base (7) provided on the floor (4), the seat cushion (2) is pivotably supported on the seat back (3), the base (7) includes left and right base side members (11) extending in the front-rear direction and a base cross member (13) extending laterally and joined to the left and right base side members (11), and the harness (310) is fixed to the base cross member (213).

According to this aspect, it is possible to stabilize the position of the harness below the seat cushion.

Another aspect of the present invention is a manufacturing method of a vehicle seat (300, 400, 500) comprising a seat cushion (2) and a seat back (3), wherein the seat cushion (2) includes a seat cushion frame (31), a pad (307) supported on the seat cushion frame (31), and a cover (418) covering the pad (307), and the seat cushion frame (31) includes left and right side members (32) extending in a front-rear direction, a front member extending laterally and joined to front portions of the left and right side members (32), and a rear member (34) extending laterally and joined to rear portions of the left and right side members (32), the manufacturing method comprising: a step of providing a flexible sheet-shaped member (301) extending in the front-rear direction and having a vertically facing surface such that the sheet-shaped member spans between the front member (33) and the rear member (34); and a step of supporting the pad (307) provided with an occupant detection sensor (309) on the seat cushion frame (31) and the sheet-shaped member (301).

According to this aspect, the vehicle seat including the sheet-shaped member and the occupant detection sensor can he manufactured with a simple procedure.

Effect of the Invention

One aspect of the present invention is a vehicle seat (1, 200), comprising: a base (7) provided on a floor (4); a seat back (3) pivotably provided on the base (7); a seat cushion (2) pivotably provided on the seat back (3); and a reclining drive unit (61) connected to the base and the seat back (3) to make the seat back (3) pivot relative to the base (7), wherein the reclining drive unit (61) is disposed more rearward than a front end of the seat cushion (2).

According to this aspect, since the reclining drive unit is disposed more rearward than the front end of the seat cushion, it is possible to widen the space in front of the seat cushion. Also, since the reclining drive unit is connected to the base and the seat back, it is unnecessary to fix the reclining drive unit to the floor, and the installation work can be made easy.

In the above aspect, preferably, the base (7) includes left and right base side members (11) extending in a front-rear direction and a base cross member (13, 213) extending laterally and joined to the left and right base side members (11), and the reclining drive unit includes a case (61A) supported on the base cross member (13, 213), a nut (61B) rotatably supported on the case, a reclining electric motor (61D) joined to the case and generating a driving force for rotating the nut (61B), and a screw shaft (61C) that is threadingly engaged with the ball screw nut (61B), extends in the front-rear direction, and is pivotably connected to the seat back (3) at a rear end thereof.

According to this aspect, since the reclining drive unit is disposed on the base cross member provided between the left and right base side members, the seat back can be pivoted stably by a single reclining drive unit.

In the above aspect, preferably, the case (61A) is joined to the base cross member (13, 213) via a hinge.

According to this aspect, it is possible to make the ball screw shaft pivot in accordance with the angle of the seat back, and therefore, it is possible to make the seat back pivot efficiently.

In the above aspect, preferably, the base cross member (213) is formed of a pipe member having at least one bent part (214).

According to this aspect, it is possible to simplify the configuration of the base cross member while improving the stiffness.

In the above aspect, preferably, the seat back (3) includes left and right back side members (17) and a lower member (19) extending laterally and joined to the left and right back side members (17), and the rear end of the screw shaft (61C) is pivotably connected to the lower member (19).

According to this aspect, since the ball screw shaft is connected to the lower member disposed between the left and right back side members, the load from the ball screw shaft can be transmitted to the seat back stably.

In the above aspect, preferably, the left and right back side members (17) each include a plate-shaped main body (17A) having a laterally facing surface and an edge wall portion (17D) protruding laterally inward from an edge of the main body (17A), and the lower member (19) includes a first channel member (19A) having a groove-shaped cross section and welded to the edge wall portions (17D) at left and right end portions thereof.

According to this aspect, it is possible to improve the stiffness of the lower member. Therefore, the driving force from the reclining drive unit can be efficiently transmitted to the seat back.

In the above aspect, preferably, the lower member (19) includes a second channel member (19B) having a groove-shaped cross section, disposed inside the first channel member (19A), and joined to the first channel member (19A), and the rear end of the screw shaft (61C) is connected to the first channel member (19A) at a position corresponding to the second channel member (19B) in a lateral direction.

According to this aspect, it is possible to improve the stiffness of the part of the lower member to which the ball screw shaft is connected. Therefore, the driving force from the reclining drive unit can be efficiently transmitted to the seat back.

In the above aspect, preferably, the lower member (19) is provided with a bracket (217) that pivotably supports the screw shaft (61C), and in a state in which the seat back (3) extends vertically, the bracket (217) extends downward and forward from the lower member (19) and supports, at a tip end portion thereof, the rear end of the screw shaft (61C) to be pivotable about a laterally extending axis.

According to this aspect, in the state in which the seat back extends horizontally, namely, in the stowed state of the seat, the bracket extends downward from the lower member, and therefore, the bracket and the rear end of the screw shaft are disposed lower than the rear surface of the seat back.

In the above aspect, preferably, the reclining electric motor (61D) is disposed more rearward than the base cross member (213).

According to this aspect, the distance from the seat back to the reclining electric motor and the nut can be made short and the ball screw shaft can be made short, Therefore, the reclining drive unit can be made compact.

In the above aspect, preferably, a rotation shaft of the reclining electric motor (61D) extends in a lateral direction, and in plan view, an axis of the screw shaft (61C) extends in the front-rear direction.

According to this aspect, the distance from the seat back to the reclining electric motor and the nut can be made short and the ball screw shaft can be made short. Therefore, the reclining drive unit can be made compact.

In the above aspect, preferably, the vehicle seat comprises: a lock device (5) that selectively restricts pivoting of the seat back (3) relative to the floor (4); a lock device drive unit (41) that is provided with a lock device electric motor (41A) and drives the lock device (5); and an electronic control unit (42) that controls the lock device electric motor (41A), wherein the seat back (3) includes a seat back frame (16), and the lock device drive unit (41) and the electronic control unit (42) are arranged in a vertical direction on one side of the seat back frame (16) in a lateral direction.

According to this aspect, the electronic control unit can be disposed at a position in the vehicle seat where it does not obstruct operation of the seat. Also, influence of the electronic control unit and the lock device electric motor on the back of the occupant can be reduced.

Another aspect of the present invention is a manufacturing method of a vehicle seat (1, 200), comprising: a step of providing a seat back (3) on a base (7) in a pivotable manner, a step of providing a seat cushion (2) on the seat back (3) in a pivotable manner; and a step of connecting a reclining drive unit (61) for making the seat back (3) pivot relative to the base (7) to the base (7) and the seat back (3) such that the reclining drive unit is provided more rearward than a front end of the seat cushion (2).

According to this aspect, the vehicle seat provided with the reclining drive unit can be unitized. Therefore, installation of the vehicle seat to the vehicle becomes easy.

In another aspect of the present invention, preferably, the seat back frame (16) includes a plate member (24), the plate member (24) includes a planar part (24B) and multiple ridges (24C) protruding from the planar part (24B), the first bracket (44) is joined to at least one of the planar part (24B) and the ridges (24C) so as to overlap with the planar part (24B) and the ridges (24C) as seen in a direction perpendicular to the plate member (24), and the electronic control unit (42) is attached to the first bracket (44).

According to this aspect, it is possible to enhance the stability of the first bracket by disposing the first bracket on a part of the plate-shaped member having high stiffness.

In the above aspect, preferably, the seat back frame (16) includes left and right side members (17) extending vertically and joined to the plate member (24) and an upper member (18) extending laterally and joined to upper ends of the left and right side members (17), wherein the electronic control unit (42) is disposed in a corner defined by the upper member (18) and one of the left and right side members (17).

According to this aspect, the electronic control unit can be disposed by effectively using the space formed by the upper member, the side member, and the plate member. Also, influence of the electronic control unit on the back of the occupant can be reduced.

In the above aspect, preferably, the upper member (18) is provided with left and right headrest supporting parts (26) for supporting a headrest, and at least a part of the electronic control unit is disposed between the side member (17) and the headrest supporting part (26) that laterally correspond thereto.

According to this aspect, the electronic control unit can be disposed by effectively using the space formed by the side member and the headrest supporting part. Also, influence of the electronic control unit on the back of the occupant can be reduced.

In the above aspect, preferably, the lock device drive unit (41) is disposed below the electronic control unit (42).

According to this aspect, the electronic control unit and the lock device drive unit can be arranged in the seat back in a space-efficient manner.

In the above aspect, preferably, the seat back frame (16) includes a cross member (21) that extends laterally to pass between the lock device drive unit (41) and the electronic control unit (42) and is joined to the left and right side members (17).

According to this aspect, it is possible to improve the stiffness of a part of the seat back frame where the electronic control unit and the lock device drive unit are mounted.

In the above aspect, preferably, the electronic control unit (42) is disposed in a space defined by the side member (17) and the headrest supporting part (26) that laterally correspond thereto, the upper member (18), and the cross member (21).

According to this aspect, the electronic control unit can be disposed by effectively using the space formed by the upper member, the side member, the headrest supporting part, the cross member, and the plate member. Also, influence of the electronic control unit on the back of the occupant can be reduced.

In the above aspect, preferably, the lock device drive unit (41) is attached to a second bracket (46) joined to the side member (17), an end portion (21A) of the cross member is bent in a direction opposite front the second bracket (46) and is joined to the side member (17).

According to this aspect, the cross member can be joined to the side member while avoiding interference with the second bracket.

In the above aspect, preferably, the seat back (3) is pivotably joined to the base (7) provided on the floor (4) via the lock device (5), the seat cushion (2) is pivotably joined to the seat back (3), and the seat cushion (2) descends when the seat back (3) pivots forward.

According to this aspect, the seat can be stowed compactly. Also, since the electronic control unit is provided on the seat back, the seat cushion can be stowed compactly on the floor.

In the above aspect, preferably, lower ends of the left and right side members (17) are pivotably joined to the base (7) provided on the floor (4) via the lock device (5), the lock device (5) includes an operation shaft (5A) extending along a pivot axis of the side members (17) and penetrating the side member (17) to protrude laterally inward of the side member (17) and permits or restricts rotation of the side member (17) relative to the floor (4) according to rotation of the operation shaft (5A), an end portion of the operation shaft (5A) is provided with an operation lever (5B) that extends in a radial direction and is connected to the lock device drive unit (41) via a transmission member, and a lower end of the side member (17) is provided with a sensor (57) for detecting a position of the operation lever (5B).

According to this aspect, the state of the lock device can be detected by the sensor.

In the above aspect, preferably, the seat cushion (2) includes left and right links (37) pivotably supported on the left and right side members (17), and when the seat back (3) is in a seating position, the sensor (57) is disposed between the side member (17) and the link (37) that correspond thereto.

According to this aspect, it is possible to prevent the sensor from interfering with the link.

In the above aspect, preferably, the vehicle seat comprises: a lower member (19) extending laterally and joined to lower portions of the left and right side members (17); a reclining drive unit (61) provided on the base (7) to make the seat back frame pivot relative to the base (7), and a harness (67) connecting the electronic control unit (42) and the reclining drive unit (61), wherein a part of the harness (67) is supported on the lower member (19).

According to this aspect, the harness can be disposed stably.

Another aspect of the present invention is a vehicle seat (300, 400, 500) comprising a seat cushion (2) and a seat back (3), wherein the seat cushion (2) includes a seat cushion frame (31), a pad (307) supported on the seat cushion frame (31), and a skin member (308) covering the pad (307), the seat cushion frame (31) includes left and right side members (32) extending in a front-rear direction, a front member (33) extending laterally and joined to front portions of the left and right side members (32), and a rear member (34) extending laterally and joined to rear portions of the left and right side members (32), a flexible sheet-shaped member (301) extending in the front-rear direction and having a vertically facing surface is provided to span between the front member (33) and the rear member (34), at least a part of the pad (307) is supported on the sheet-shaped member (301) from below, and the pad (307) is provided with an occupant detection sensor (309).

According to this aspect, an occupant detection device can be disposed in the vehicle seat including the sheet-shaped member.

In the above aspect, preferably, the occupant detection sensor (309) is provided on an upper surface of the pad (307), and a harness (310) connected to the occupant detection sensor (309) extends from the occupant detection sensor (309) to below the sheet-shaped member (301) by passing through a first hole (307A) vertically penetrating the pad (307) and passing a second hole (312) vertically penetrating the sheet-shaped member (301).

According to this aspect, in the seat cushion including the sheet-shaped member, the harness extending from the occupant detection sensor can extend to below the sheet-shaped member.

In the above aspect, preferably, a grommet (314) is fitted on an edge part of the second hole (312).

According to this aspect, damage to the edge part of the second hole due to contact with the harness can be prevented.

In the above aspect, preferably, a support member (522) that has flexibility and supports the sheet-shaped member (301) from below is provided between the front member (33) and the rear member (34), and the harness (310) extends from the occupant detection sensor (309) to below the support member (522) by passing through a third hole (313) provided in the support member (522).

According to this aspect, in the seat cushion including the support member that supports the sheet-shaped member, the harness extending from the occupant detection sensor can extend to below the sheet-shaped member.

In the above aspect, preferably, the occupant detection sensor (309) is provided on an upper surface of the pad (307), and a harness (310) connected to the occupant detection sensor (309) extends from the occupant detection sensor (32) to below the sheet-shaped member (301) by passing through a first hole (311) vertically penetrating the pad (307) and passing through a gap between the sheet-shaped member (301) and the side member (32).

According to this aspect, in the seat cushion including the sheet-shaped member, the harness extending from the occupant detection sensor can extend to below the sheet-shaped member.

In the above aspect, preferably, a cover (418) made of resin is fitted on the side member (33), and the harness (310) extends from the occupant detection sensor (309) to below the sheet-shaped member (301) by passing a gap between the sheet-shaped member (301) and the cover (418).

According to this aspect, contact between the harness and the side member can be avoided, and wear of the harness can be suppressed.

In the above aspect, preferably, the seat back (3) pivots between a use position in which the seat back extends upward from a rear portion of the seat cushion (2) and a stowed position to which the seat back pivots forward from the use position to overlap with an upper side of the seat cushion (2), at least one of the seat cushion (2) and the seat back (3) is provided with a restricting part (315) that restricts a position of the seat back (3) in the stowed position relative to the seat cushion (2), the restricting part (315) suppressing a load imparted on the occupant detection sensor (309) from the seat back (3) to be less than or equal to a predetermined value when the seat back (3) is in the stowed position.

According to this aspect, when the seat back is in the stowed position, it is possible to prevent erroneous detection due to pressing of the occupant detection sensor by the seat back.

In the above aspect, preferably, the seat back (3) includes left and right side supporting parts (316) protruding forward from left and right side portions in the use position, and the restricting part (315) includes the side supporting parts (316).

According to this aspect, the load applied to the occupant detection sensor from the seat back can be suppressed by using the side supporting parts.

In the above aspect, preferably, the seat back (3) is provided with a headrest (317), and the restricting part (315) includes the headrest (317).

According to this aspect, the load applied to the occupant detection sensor from the seat back can be suppressed by using the headrest.

In the above aspect, preferably, the seat back (3) is pivotably supported on the base (7) provided on the floor (4), the seat cushion (2) is pivotably supported on the seat back (3), the base (7) includes left and right base side members (11) extending in the front-rear direction and a base cross member (13) extending laterally and joined to the left and right base side members (11). and the harness (310) is fixed to the base cross member (213).

According to this aspect, it is possible to stabilize the position of the harness below the seat cushion.

Another aspect of the present invention is a manufacturing method of a vehicle seat (300, 400, 500) comprising a seat cushion (2) and a seat back (3), wherein the seat cushion (2) includes a seat cushion frame (31), a pad (307) supported on the seat cushion frame (31), and a cover (418) covering the pad (307), and the seat cushion frame (31) includes left and right side members (32) extending in a front-rear direction, a front member extending laterally and joined to front portions of the left and right side members (32), and a rear member (34) extending laterally and joined to rear portions of the left and right side members (32), the manufacturing method comprising: a step of providing a flexible sheet-shaped member (301) extending in the front-rear direction and having a vertically facing surface such that the sheet-shaped member spans between the front member (33) and the rear member (34); and a step of supporting the pad (307) provided with an occupant detection sensor (309) on the seat cushion frame (31) and the sheet-shaped member (301).

According to this aspect, the vehicle seat including the sheet-shaped member and the occupant detection sensor can be manufactured with a simple procedure.

BRIEF DESCRIPTION OF THE DRAWINGS

FIG. 15 is (A) a rear view and (B) a side view of a bracket;

FIG. 23 is a diagram showing a cover of a seat cushion frame according to the fourth embodiment;

MODE(S) FOR CARRYING OUT THE INVENTION

In the following, one embodiment in which a vehicle seat 1, 200 according to the present invention is applied to a rear seat (including second and third rows) of an automobile will be described with reference to the drawings. As described later, the vehicle seat 1, 200 changes its form between a use form (seating form) and a stowed form. The shape, and direction of each component of the vehicle seat 1, 200 will be described based on the use form unless otherwise specified. Also, when it is described that certain members are joined, the mode of joining may include welding and fastening unless otherwise specified.

Figure 1:
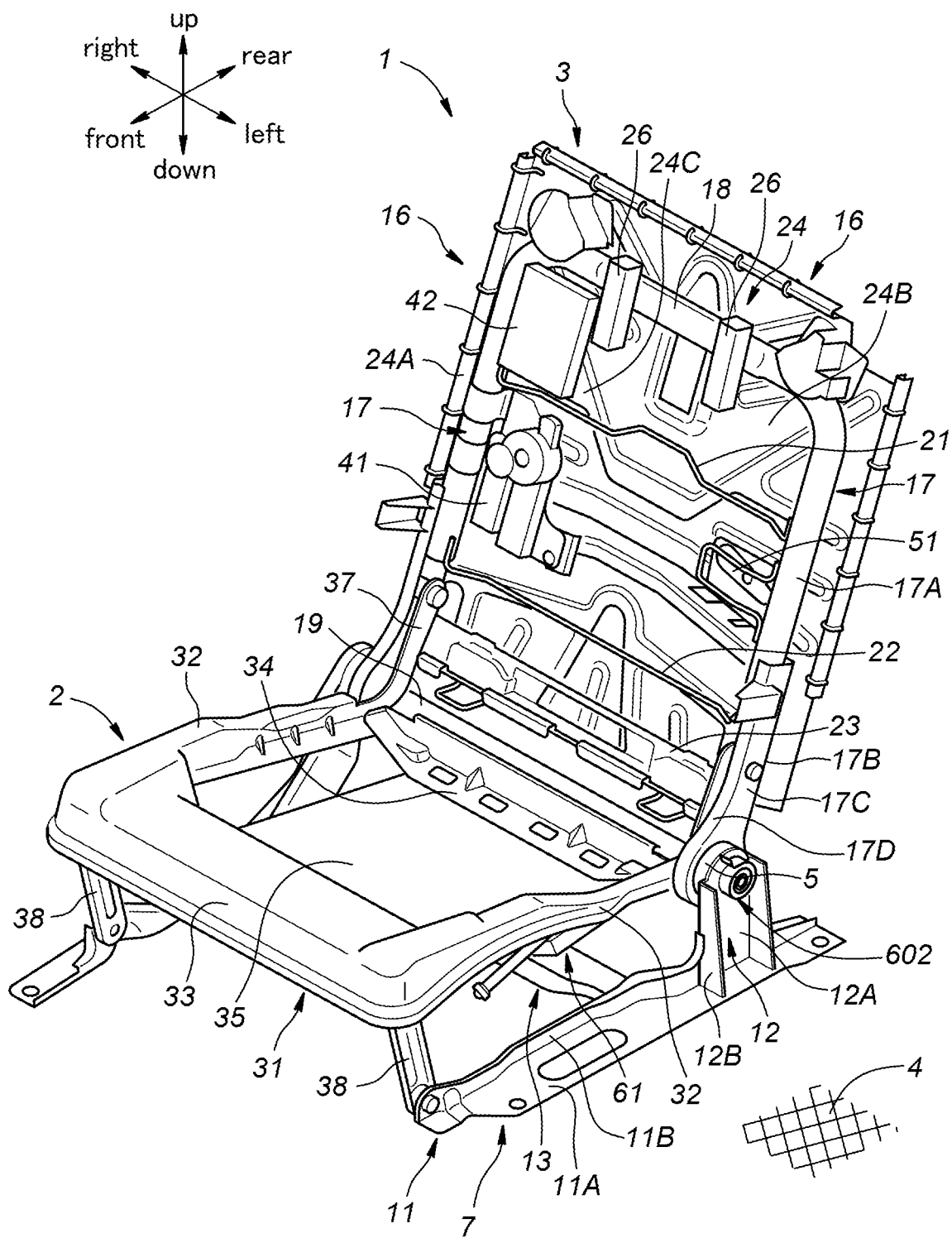
FIG. 1 is a perspective view of a frame of a vehicle seat according to an embodiment.
Figure 10:
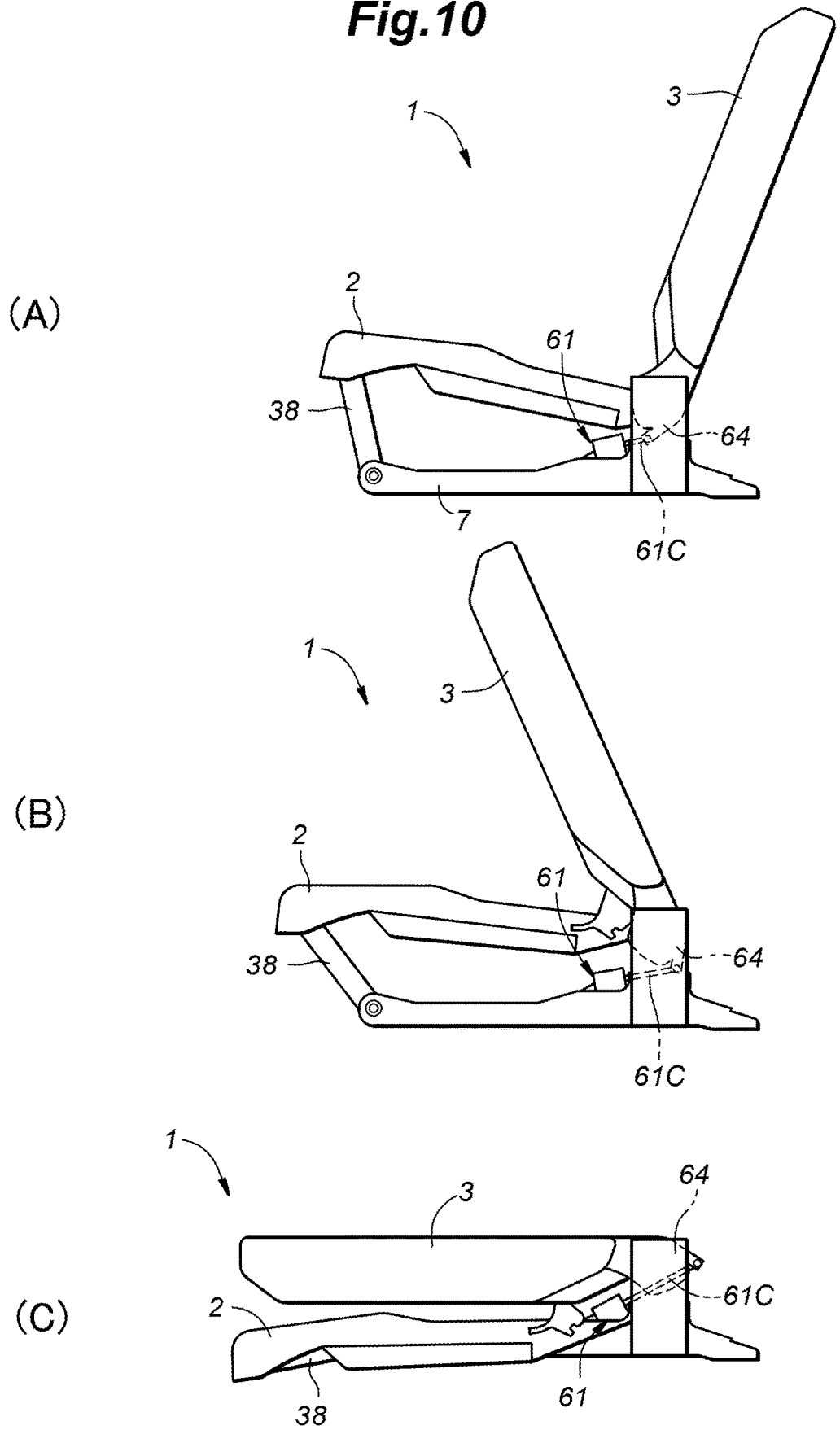
FIG. 10 is a side view showing (A) a use form, (B) a transition state from the use form to a stowed form, and (C) a stowed form of the vehicle seat.

As shown in FIGS. 1 and 10, the vehicle seat 1 includes a seat cushion 2 and a seat back 3. The seat back 3 is pivotably supported on a floor 4, and the seat cushion 2 is pivotably supported on the seat back 3. Between the seat back 3 and the floor 4, lock devices 5 that selectively restrict pivoting of the seat back 3 relative to the floor 4 is provided. In the use form of the vehicle seat 1, the seat back 3 stands upright relative to the floor 4 and the seat cushion 2 is spaced upward from the floor 4. With the seat back 3 pivoting forward from the use form of the vehicle seat 1, the vehicle seat 1 changes to the stowed form. Due to changing of the vehicle seat 1 from the use form to the stowed form, the seat cushion 2 moves downward to be close to the floor 4. In the stowed form of the vehicle seat 1, the seat back 3 extends substantially horizontally and overlaps above the seat cushion 2.

Figure 2:
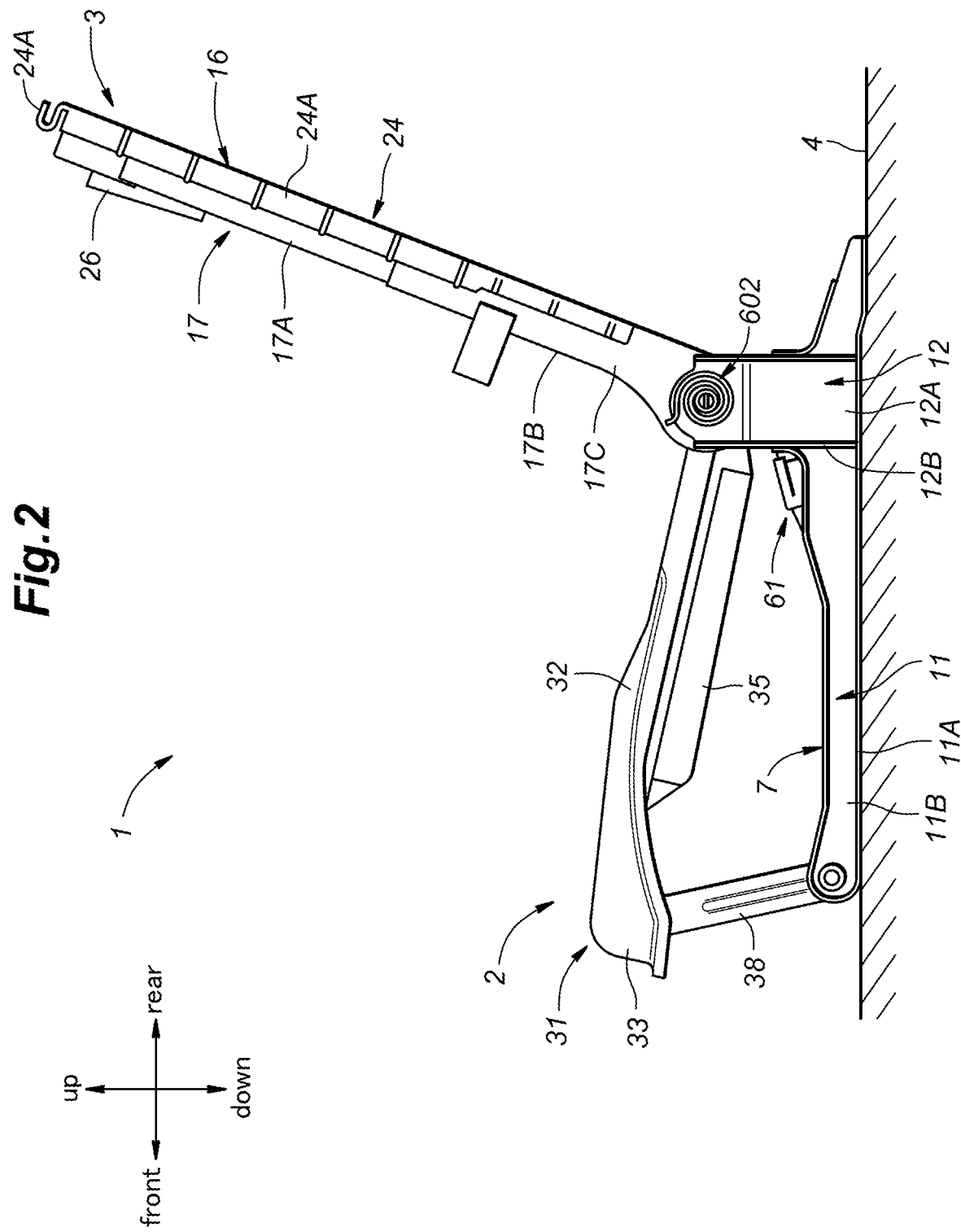
FIG. 2 is a side view of the frame of the vehicle seat.

As shown in FIGS. 1 and 2, a base 7 is provided on the floor 4. The base 7 includes left and right base side members 11 extending in the front-rear direction on the upper surface of the floor 4 and joined to the floor 4, left and right base pillars 12 extending upward from rear ends of the left and right base side members 11, and a base cross member 13 extending laterally and joined to the left and right base side members 11. Each of the base side members 11, the base pillars 12, and the base cross member 13 is formed of a sheet metal.

Figure 3:
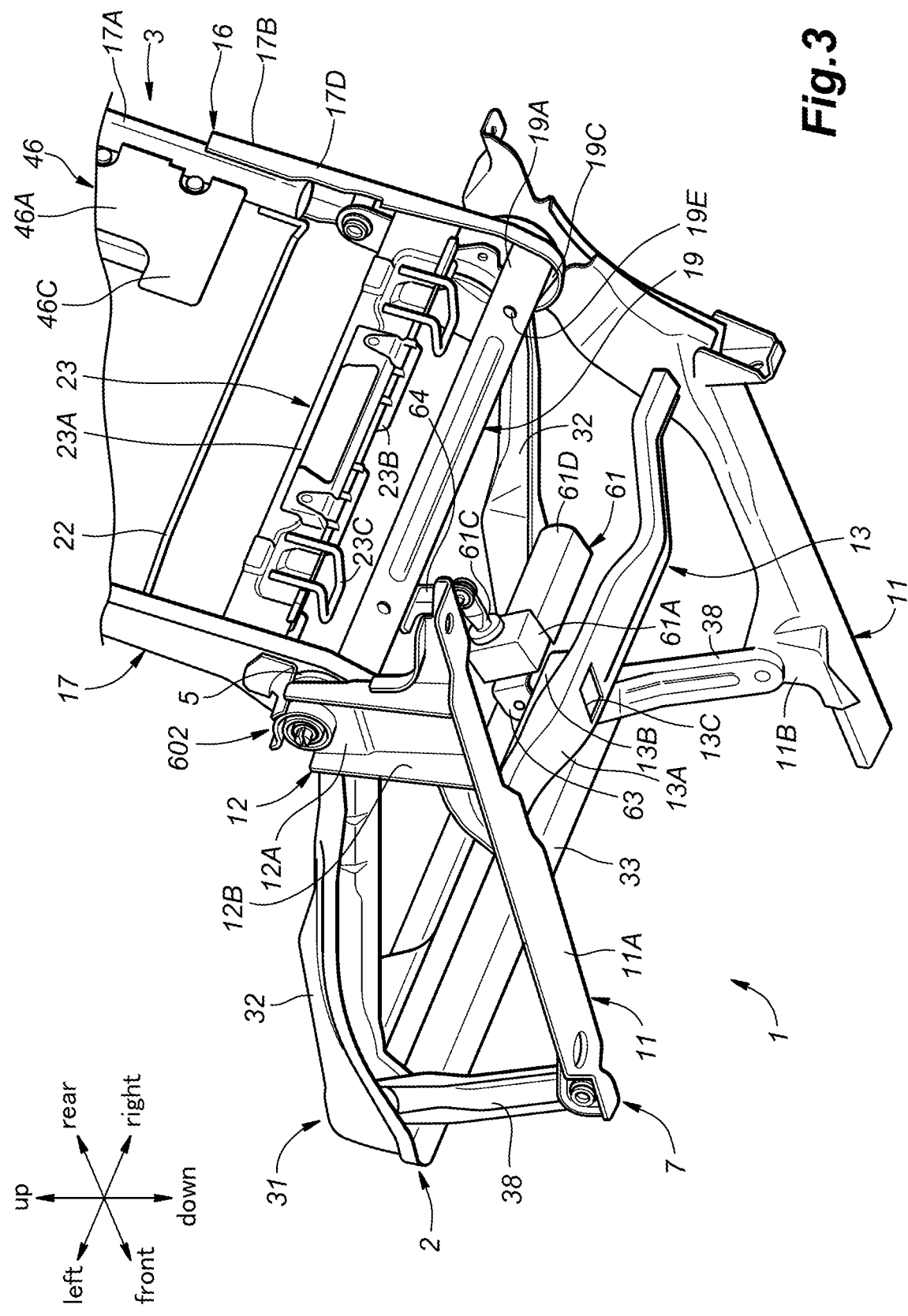
FIG. 3 is a perspective view showing the frame of the vehicle seat from below and behind, with a plate member being removed.

As shown in FIGS. 1 to 3, the left and right base side members 11 each include a bottom wall portion 11A having a vertically facing surface and joined to the floor 4 and a vertical wall portion 11B extending upward from a side edge of the bottom wall portion 11A. The base pillar 12 and the base side member 11 may be formed of a common sheet metal or may be formed of mutually independent sheet metals. In the present embodiment, the right base pillar 12 is formed integrally with the base side member 11. The left base pillar 12 is formed of a sheet metal independent from that of the base side member 11 and is joined to the base side member 11. The base pillars 12 each include a plate-shaped pillar main body 12A having a laterally facing surface and pillar edge wall portions 12B extending laterally outward from the front edge and the rear edge of the pillar main body 12A.

The base cross member 13 includes a lower channel member 13A having a groove-shaped cross section that opens upward and an upper channel member 13B having a groove-shaped cross section that opens downward. The length of the upper channel member 13B in the lateral direction is shorter than the length of the lower channel member 13A in the lateral direction. The upper channel member 13B and the lower channel member 13A cooperate to form a closed cross section structure. Preferably, the upper channel member 13B is fitted into an inside of the lower channel member 13A. The left and right end portions of the lower channel member 13A are joined to the vertical wall portions 11B of the corresponding base side members 11. The left end portion of the upper channel member 13B is joined to the left vertical wall portion 11B. The right end portion of the upper channel member 13B is disposed more leftward than the center of the lower channel member 13A in the lateral direction. Preferably, the bottom portions of the lower channel member 13A and the upper channel member 13B are provided with an uneven surface structure, such as beads, to enhance the stiffness.

Figure 4:
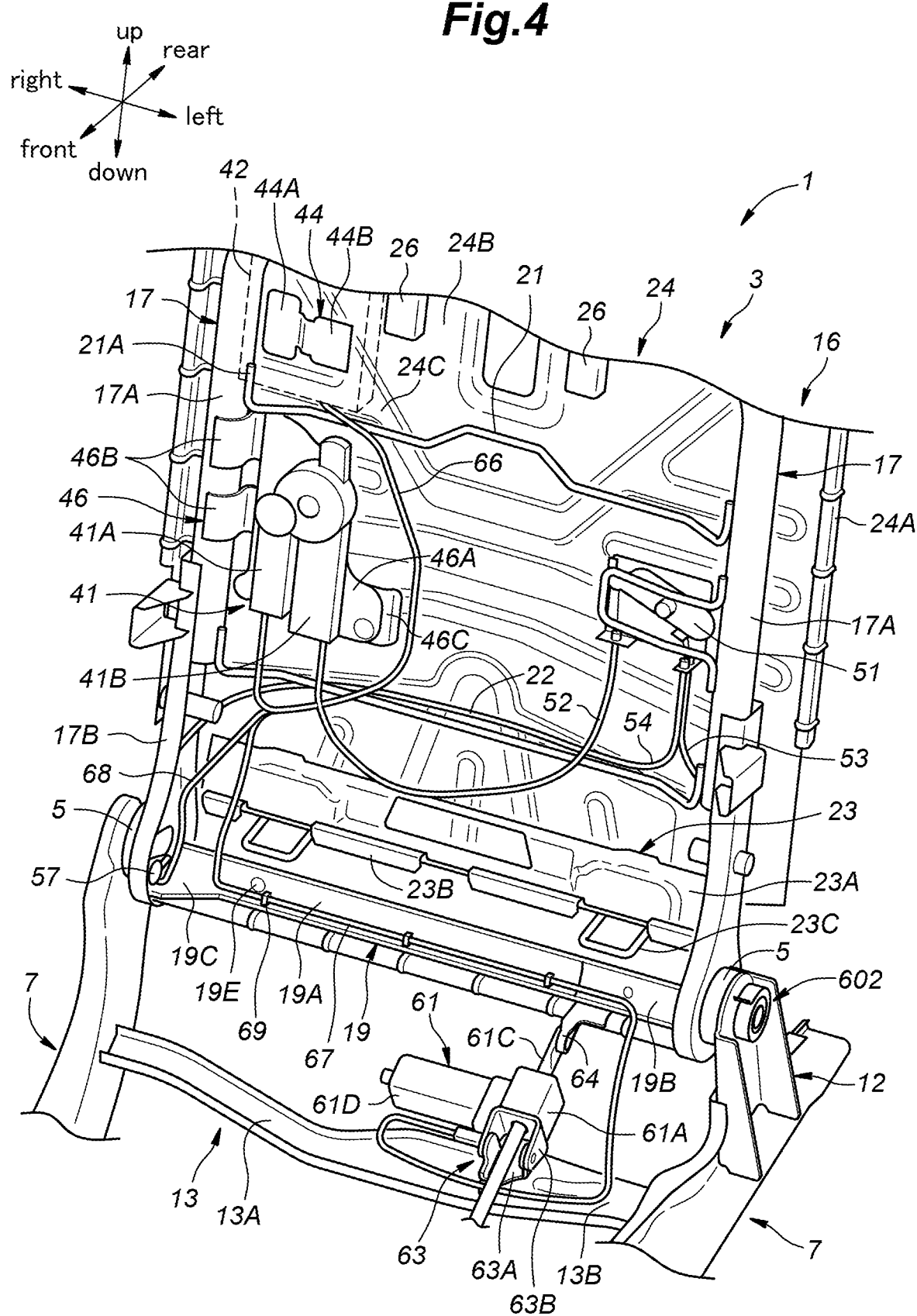
FIG. 4 is a perspective view showing a lower portion of a seat back frame.

As shown in FIGS. 1 and 4, the seat back 3 includes a seat back frame 16. The seat back frame 16 supports a pad (not shown in the drawings) thereon, and the pad and the seat back frame 16 are covered by a skin member not shown in the drawings). The seat back frame 16 includes left and right back side members 17, an upper member 18, a lower member 19. a first cross member 21, a second cross member 22, a third cross member 23, and a plate member 24. The left and right hack side members 17 are laterally spaced from each other and extend vertically. The upper member 18 extends laterally and is joined to the upper ends of the left and right back side members 17. The lower member 19 extends laterally below the upper member 18 and is joined to lower portions of the left and right back side members 17. The first to third cross members 21 to 23 extend laterally between the upper member 18 and the lower member 19 and are joined to intermediate portions of the left and right back side members 17.

The left and right back side members 17 each include a side member upper portion 17A and a side member lower portion 17B joined to the side member upper portion 17A. The left and right side member upper portions 17A and the upper member 18 are formed by bending a continuous pipe member. The left and right side member lower portions 17B each include a main body 17C formed of a sheet metal and having a laterally facing surface and an edge wall portion 17D bent over laterally inward from an edge of the main body 17C.

The upper member 18 is provided with left and right headrest supporting parts 26. The left and right headrest supporting parts 26 are spaced from each other and are joined to the front surface of a laterally central part of the upper member 18. The left and right headrest supporting parts 26 are each formed in a tubular shape and extend downward from the upper member 18.

As shown in FIGS. 4 to 7, the lower member 19 includes a rear channel member 19A having a groove-shaped cross section that opens forward and a front channel member 19B having a groove-shaped cross section that opens forward. The length of the front channel member 19B in the lateral direction is shorter than the length of the rear channel member 19A in the lateral direction. The rear channel member 19A and the front channel member 19B cooperate to form a closed cross section structure. Preferably, the front channel member 19B is fitted into an inside of the rear channel member 19A. The left and right end portions of the rear channel member 19A are disposed on the inner side of the edge wall portions 17D of the laterally corresponding side member lower portions 17B and are welded to the edge wall portions 17D. Preferably, the end portions of the edge wall portions 17D of the side member lower portions 17B are welded to the rear surface of the rear channel member 19A. Each end portion of the rear channel member 19A includes an extension part 19C to enlarge the contact surface area with the edge wall portion 17D of the corresponding side member lower portion 17B. The extension part 19C is preferably provided on a tip of a side wall portion of the rear channel member 19A forming a groove shape.

The left end portion of the front channel member 19B is joined to the main body 17C of the left side member lower portion 17B. The right end portion of the front channel member 19B is disposed more leftward than the center of the rear channel member 19A in the lateral direction. Preferably, the bottom portions of the rear channel member 19A and the front channel member 19B are provided with a projection 19D, such as a bead, to enhance the stiffness. Preferably, the projection 19D swells toward the front channel member 19B and is in contact with the front channel member 19B. Also, the projection 19D preferably extends laterally along the rear channel member 19A.

As shown in FIGS. 1 and 4, the first cross member 21 and the second cross member 22 are each formed of a rod-shaped member having a circular cross section. The first cross member 21 extends laterally below the upper member 18 and above the lower member 19. The left and right end portions 21A of the first cross member 21 are bent upward relative to the central portion and are welded to the corresponding side member upper portions 17A. The second cross member 22 extends laterally below the first cross member 21 and above the lower member 19. The left and right end portions of the second cross member 22 are bent upward relative to the central portion and are welded to the corresponding side member upper portions 17A.

The third cross member 23 extends laterally below the second cross member 22 and above the lower member 19 and is welded to the left and right side member lower portions 17B. Preferably, the third cross member 23 is formed of multiple sheet metal members. The third cross member 23 includes a main body 23A that has a surface facing in the front-rear direction and bent parts 23B which extend forward and upward from the lower edge of the main body 23A and thereafter are further bent to extend downward. The lower edge of the third cross member 23 is provided with anchors 23C protruding forward. The anchors 23C are used to lock the hooks of a child seat.

The plate member 24 has a surface facing in the front-rear direction and is welded to the left and right back side members 17, the upper member 18, the lower member 19, and the third cross member 23. The upper edge of the plate member 24 is positioned higher than the upper member 18 and extends laterally. The lower edge of the plate member 24 is positioned lower than the lower member 19 and extends laterally. The left and right side edges of the plate member 24 are positioned laterally more outward than the left and right back side members 17 and extend vertically. Each edge part of the plate member 24 is provided with a curved part 24A that is curved in an arc shape. The curved part 24A has a semi-circular cross section that is convex forward and extends along each edge part. Preferably, each curved part 24A is provided with an uneven surface structure such as multiple beads. Each uneven surface structure preferably extends in a direction perpendicular to the extension direction of the curved part 24A. Each curved part 24A and each uneven surface structure improve the stiffness of the plate-shaped part.

The plate member 24 includes a planar part 24B that has a surface facing in the front-rear direction and multiple ridges 24C that are raised from the planar part 24B. Preferably, the ridges 24C are raised forward or rearward relative to the planar part 24B. Each ridge 24C is formed by pressing the plate-like part forward or rearward. The ridges 24C improve the stiffness of the plate member 24.

Figure 6:
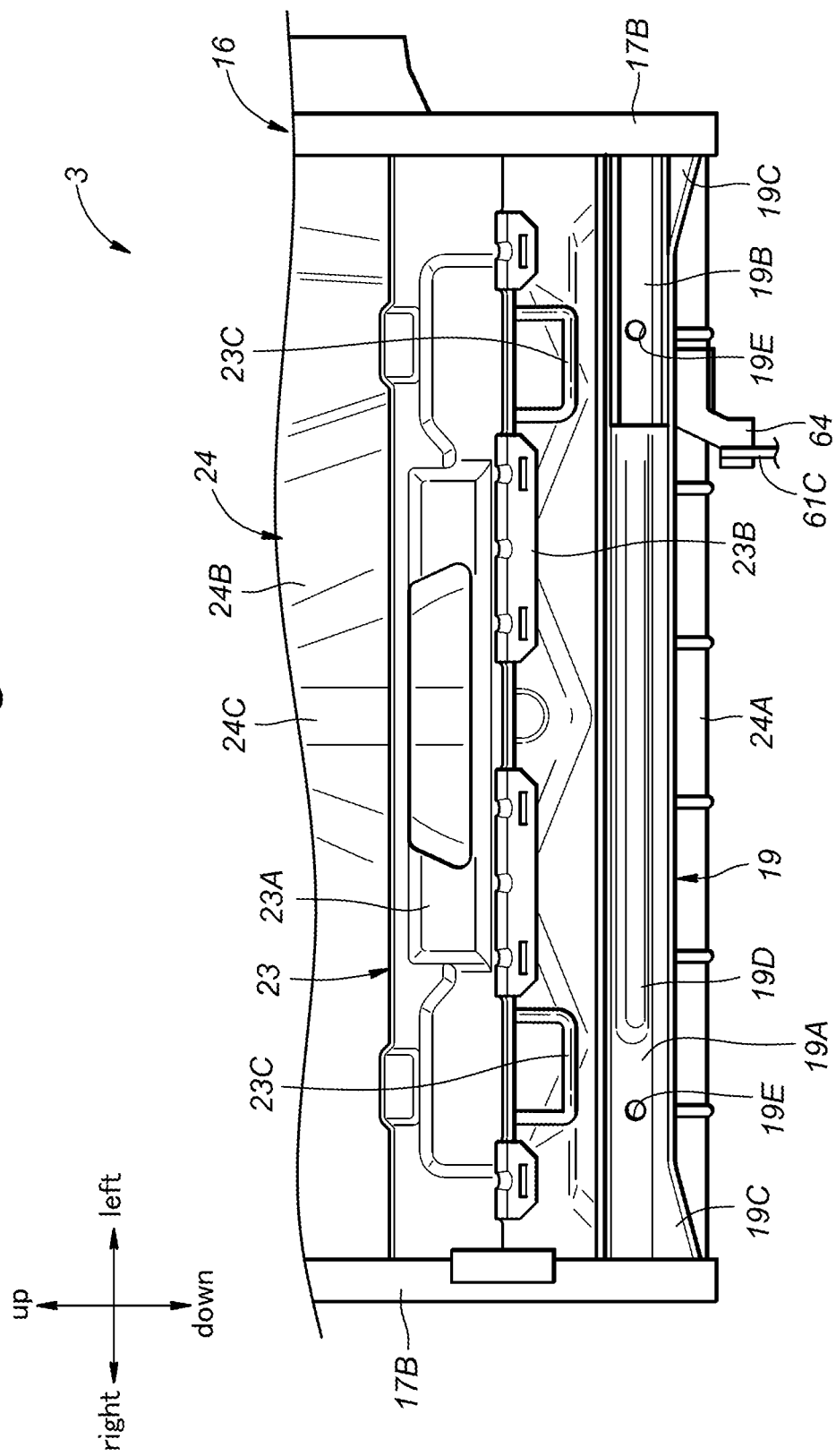
FIG. 6 is a front view showing a lower portion of the seat back frame.
Figure 7:
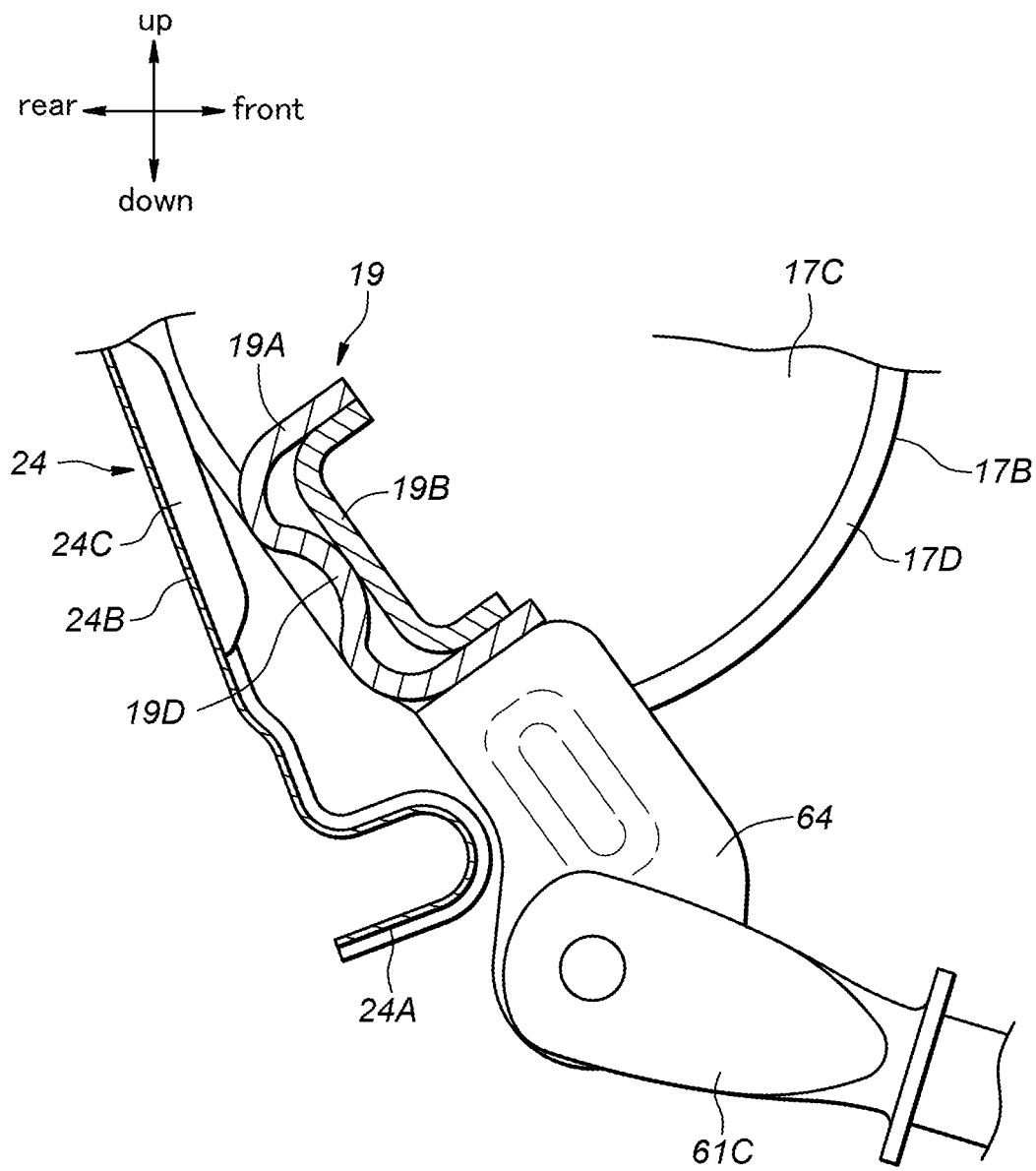
FIG. 7 is a sectional view showing a connection part between a lower member and the reclining drive unit.

As shown in FIGS. 4 and 6, the rear channel member 19A and the front channel member 19B of the lower member 19 are each formed with at least one through hole 19E that penetrates therethrough in the front-rear direction. The through hole 19E of the front channel member 19B is located in a position overlapping with the through hole 19E of the rear channel member 19A in the front-rear direction. The plate member 24 is provided with a mark for positioning the plate member 24 relative to the lower marcher 19. The mark may be a hole, a projection, a recess, a pattern, or the like. When the plate member 24 is placed in an appropriate position relative to the lower member 19, the mark is exposed forward through the through hole 19E.

In another embodiment, the left and right back side members 17, the upper member 18, and the lower member 19 may be formed integrally with the plate member 24. For example, a three-dimensional shape may be formed by press molding the plate member 24 so that the three-dimensional shape constitutes the back side members 17, the upper member 18, and the lower member 19.

Preferably, the outer shape of the electronic control unit 42 is formed in a shape that would not make the seated person feel discomfort in the back. For example, the outer shape of the left part of the electronic control unit 42 provided on the right side of the seat back 3 is preferably formed of a surface inclined rearward toward the left. Also, the outer shape of the left part of the electronic control unit 42 should be formed of a smooth curved surface. Due to this configuration, the discomfort imparted to the back of the seated person by the electronic control unit 42 provided on the seat back 3 can be reduced.

As shown in FIGS. 1 and 4, the left and right side member lower portions 17B are pivotably supported on the laterally corresponding base pillars 12 via the respective lock devices 5. The pivot axes of the left and right side member lower portions 17B extend laterally and are disposed coaxially with each other. The lock devices 5 are disposed coaxially with the pivot axes of the side member lower portions 17B.

Figure 8:
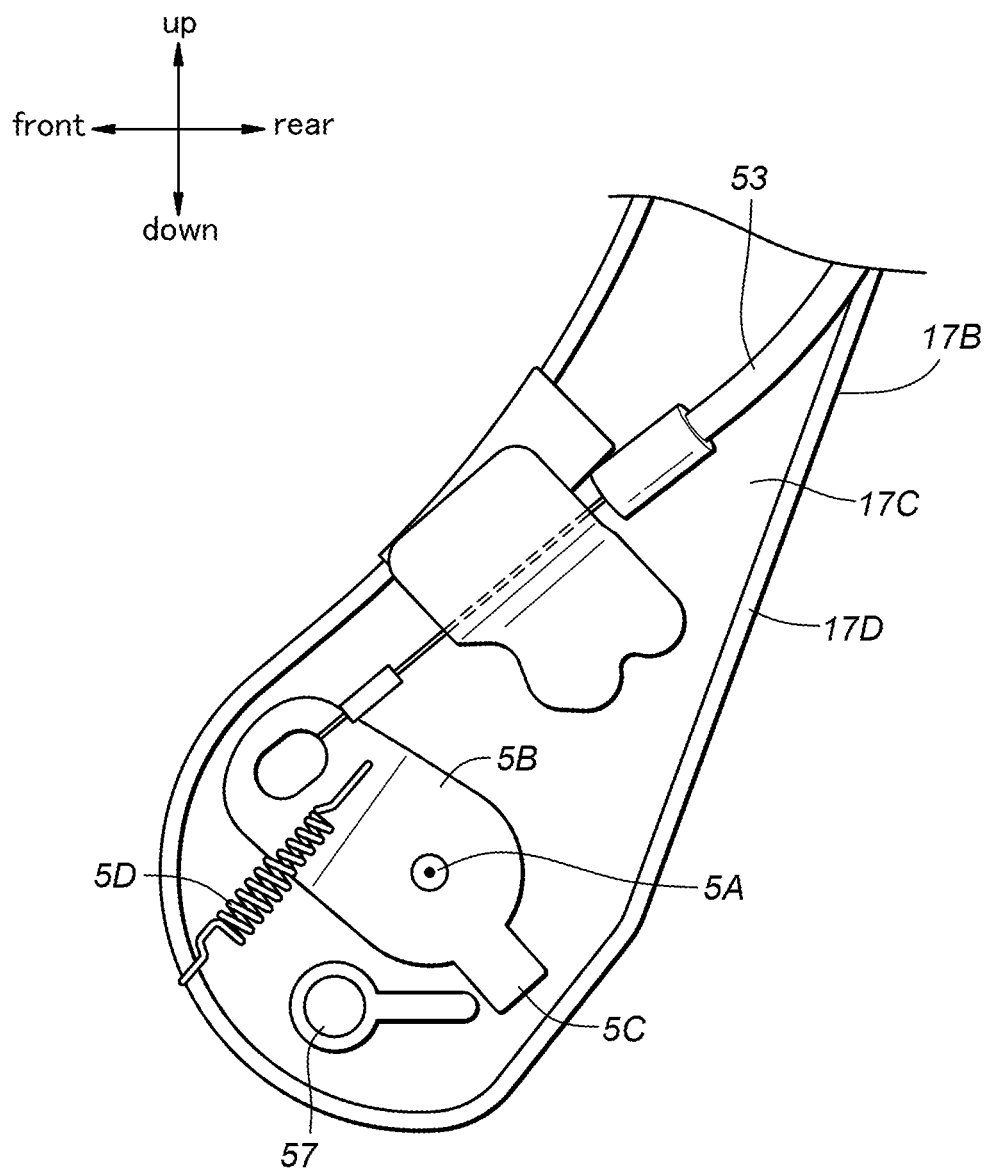
FIG. 8 is a side view showing a lower end portion of a side member lower portion.

As shown in FIG. 8, each lock device 5 includes an operation shaft 5A extending along the pivot axis of the back side member 17 and penetrating the back side member 17 to protrude laterally inward of the back side member 17, and permits or restricts rotation of the back side member 17 relative to the floor 4 according to rotation of the operation shaft 5A. The lock device 5 may have a known reclining mechanism. For example, the lock device 5 preferably includes a first pail 603A joined to the base pillar 12, a second part 603B joined to the side member lower portion 17B and rotatably supported on the first part 603A (see FIG. 27), a lock claw provided on the second part 603B and movable between an engagement position where the lock claw engage with the first part 603A and a release position where the lock claw is separated from the first part 603A, a spring urging the lock claw toward the engagement position, an operation shaft 5A disposed coaxially with the rotation axis of the second part 603B relative to the first part 603A and rotatable relative to the second part 603B, and a cam joined to the operation shaft 5A and, when rotated, causing the lock claw to move to the release position against the urging force of the spring. When no operating force is applied to the operation shaft 5A from outside, the operation shaft 5A returns to the initial position due to the urging force of the spring. When each operation shaft 5A is rotated relative to the back side member 17, the seat back 3 becomes pivotable relative to the floor 4. At the end portion of each operation shaft 5A, an operation lever 5B extending in the radial direction is provided.

As shown in FIG. 1, the seat cushion 2 includes a seat cushion frame 31. The seat cushion frame 31 supports a pad thereon, and the pad and the seat cushion frame 31 are covered by a skin member. The seat cushion frame 31 includes left and right cushion side members 32, a front member 33, a rear member 34, and a center plate 35. The left and right cushion side members 32 are laterally spaced from each other and extend in the front-rear direction. The front member 33 extends laterally and is joined to the front ends of the left and right cushion side members 32. The rear member 34 extends laterally and is joined to the rear ends of the left and right back side members 17. The center plate 35 extends in the front-rear direction and is joined to the front member 33 and the rear member 34.

To the rear ends of the left and right cushion side members 32 are joined left and right rear links 37 that extend rearward and upward. The left and right rear links 37 move unitarily with the left and right cushion side members 32. The rear ends of the left and right rear links 37 are supported on the left and right side member lower portions 17B to be pivotable about a laterally extend axis. Thereby, the seat cushion 2 is pivotably joined to the seat back 3.

The front ends of the left and right cushion side members 32 are joined to the front ends of the base side members 11 via left and right front links 38. One ends of the front links 38 are joined to the front ends of the cushion side members 32 to be pivotable about a laterally extending axis. The other ends of the front links 38 are joined to the front ends of the base side members 11 to be pivotable about a laterally extending axis.

As shown in FIG. 1, the seat back frame 16 is provided with a lock device drive unit 41 for driving the lock devices S and an electronic control unit 42 for controlling the lock device drive unit 41. The electronic control unit 42 is configured by a CPU, a non-volatile memory (ROM), a volatile memory (RAM), etc. The lock device drive unit 41 and the electronic control unit 42 are arranged in the vertical direction on one side of the seat back frame 16 in the lateral direction. In the present embodiment, the lock device drive unit 41 and the electronic control unit 42 are arranged in the vertical direction on a right side portion of the seat back frame 16.

As shown in FIG. 4, the electronic control unit 42 is mounted to the plate member 24 via a first bracket 44. The first bracket 44 may be welded to the plate member 24 or may be fastened to the plate member 24 by means of fastening members such as bolts and nuts. The first bracket 44 is joined to at least one of the planar part 24B and the ridge 24C so as to overlap with the planar part 24B and the ridge 24C as seen in a direction perpendicular to the plate member 24. The first bracket 44 includes a first part 44A joined to the planar part 24B and a second part 44B that is offset forward relative to the first part 44A and is in contact with the ridge 24C. The second part 44B may be joined to the ridge 24C. The electronic control unit 42 is fastened to the second part 44B by means of fastening members such as bolts and nuts. The first part 44A may be joined to the back side member 17 in addition to the planar part 24B.

The electronic control unit 42 and the first bracket 44 are disposed in the corner defined by one of the left and right back side members 17 and the upper member 18. In the present embodiment, the electronic control unit 42 and the first bracket 44 are disposed in the corner defined by the right back side member 17 and the upper member 18. Also, at least a part of the electronic control unit 42 is disposed between the back side member 17 and the headrest supporting part 26 that laterally correspond thereto, In the present embodiment, the upper portion of the electronic control unit 42 is disposed between the upper portion of the right back side member 17 and the right headrest supporting part 26. Also, the electronic control unit 42 and the first bracket 44 are disposed above the first cross member 21. The electronic control unit 42 is disposed in a space defined by the back side member 17 and the headrest supporting part 26 that laterally correspond thereto, the upper member 18, and the first cross member 21.

Preferably, the outer shape of the electronic control unit 42 is formed in a shape that would not make the seated person feel discomfort in the back. For example, the outer shape of the left part of the electronic control unit 42 provided on the right side of the seat back 3 is preferably formed of a surface inclined rearward toward the left. Also, the outer shape of the left part of the electronic control unit 42 should be formed of a smooth curved surface. Due to this configuration, the discomfort imparted to the back of the seated person by the electronic control unit 42 provided on the seat back 3 can be reduced.

As shown in FIGS. 1 and 4, the lock device drive unit 41 includes a lock device electric motor 41A and an output unit 41B that is moved in accordance with driving of the lock device electric motor 41A. The lock device drive unit 41 is joined to the back side member 17 via a second bracket 46. In the present embodiment, the second bracket 46 includes a main body 46A to which the lock device drive unit 41 is fastened, at least one first projecting piece 46B protruding rightward from the main body 46A and joined to the side member upper portion 17A, and at least one second projecting piece 46C protruding leftward from the main body 46A and joined to the planar part 24B or the ridge 24C of the plate member 24. The main body 46A, the first projecting piece 46B, and the second projecting piece 46C may be formed of separate members and be joined to one another. Alternatively, the main body 46A, the first projecting piece 46B, and the second projecting piece 46C may be formed of a single plate member 24.

The first projecting piece 46B is curved in a semi-circular fashion and extends along the outer circumference of the side member upper portion 17A. In the present embodiment, two first projecting pieces 46B are provided in a vertically spaced manner. The upper first projecting piece 46B is disposed lower than the end portion 21A of the first cross member 21. The end portion 21A of the first cross member 21 is bent in a direction opposite from the second bracket 46. The two first projecting pieces 46B may be welded or fastened to the side member upper portion 17A. Also, the second projecting piece 46C may be welded or fastened to the plate member 24.

The second projecting piece 46C and the lock device drive unit 41 are disposed below the electronic control unit 42. Also, the second projecting piece 46C and the lock device drive unit 41 are disposed below the first cross member 21. Namely, the first cross member 21 extends laterally to pass between the lock device drive unit 41 and the electronic control unit 42.

As shown in FIG. 4, a relay lever 51 is pivotably provided on a left part of the plate member 24 to the right of the left back side member 17. The relay lever 51 is urged toward an initial position by a spring not shown in the drawings. The lock device drive unit 41 is connected to the relay lever 51 via a first control cable 52 (transmission member). The relay lever 51 is connected to the operation lever 5B of the left lock device 5 via a second control cable 53 (transmission member) and is connected to the operation lever 5B of the right lock device 5 via a third control cable 54 (transmission member).

The base end of the right operation lever 5B is provided with a projection 5C that protrudes in a radial direction of the rotation shaft of the operation lever 5B. The lower end of the back side member 17 is provided with a sensor 57 for detecting the position of the operation lever 5B. The sensor 57 is disposed on the right side surface of the right side member lower portion 17B around the operation lever 5B. Preferably, the sensor 57 is a limit switch that pivots when pushed by the projection 5C of the operation lever 5B. When the seat back 3 is in the seating position, the sensor 57 is disposed between the back side member 17 and the rear link 37 that correspond thereto. Namely, the sensor 57 is disposed between the right back side member 17 and the right rear link 37. The operation lever 5B is connected to the side member lower portion 17B via a spring 5D and is urged toward the initial position.

Figure 5:
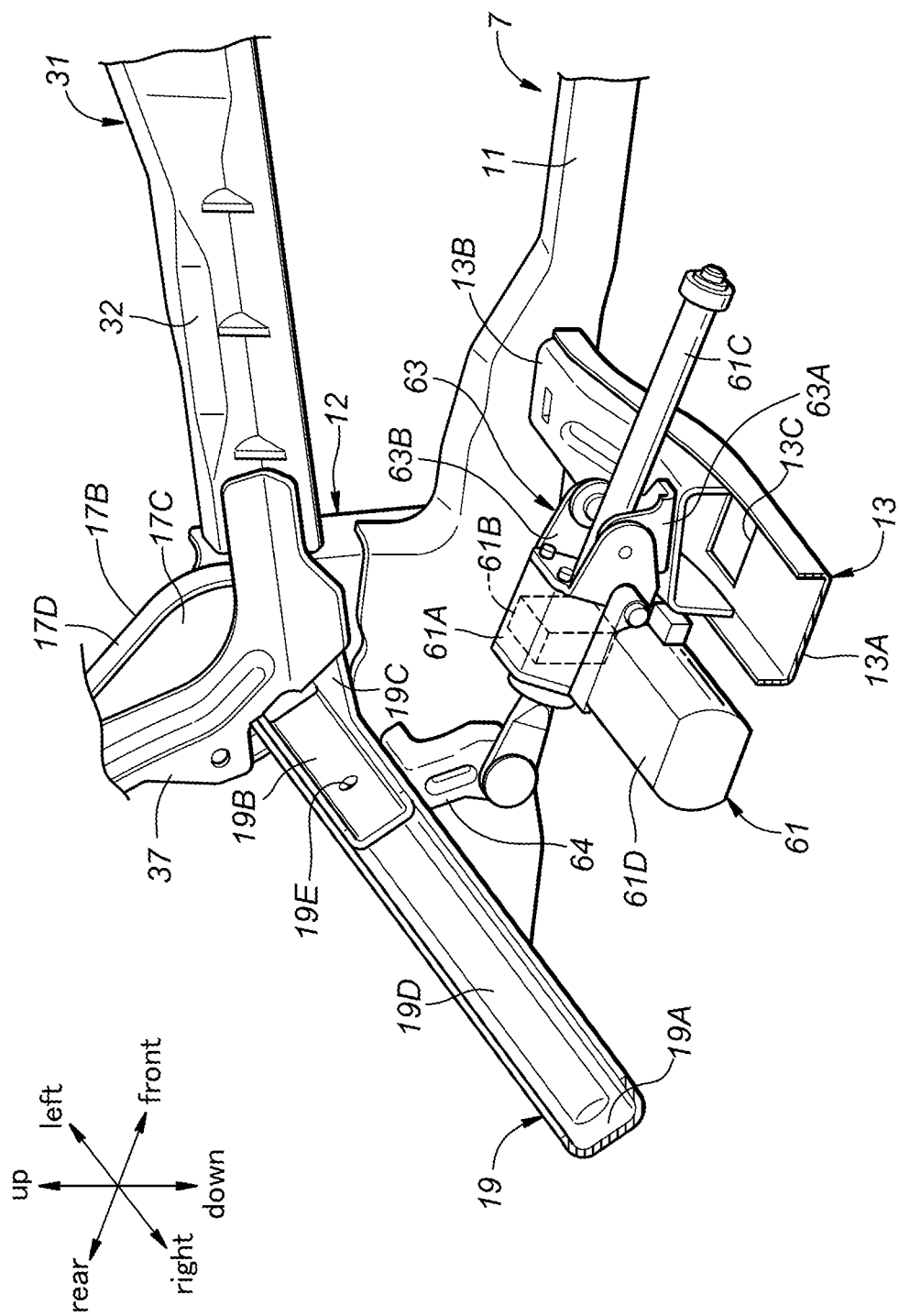
FIG. 5 is a perspective view of a reclining drive unit.

As shown in FIGS. 4 and 5, the base 7 is provided with a reclining drive unit 61 for making the seat back frame 16 pivot relative to the base 7. The reclining drive unit 61 couples the base 7 with the seat back 3 and extends and contracts to make the seat back 3 pivot relative to the base 7. The reclining drive unit 61 includes a case 61A, a ball screw nut 61B pivotably supported on the case 61A, a ball screw shaft 61C threadingly engaged with the ball screw nut 61B, and a reclining electric motor 61D mounted to the case 61A to rotate the ball screw nut 61B. The case 61A is connected to the base cross member 13 via a hinge 63 to be pivotable about a laterally extending axis. The hinge 63 includes a lower hinge bracket 63A fastened to the upper channel member 13B of the base cross member 13 and an upper hinge bracket 63B joined to the lower hinge bracket 63A to be pivotable about a laterally extending axis and fastened to the case 61A. The bottom portion of the lower channel member 13A of the base cross member 13 is formed with a work hole 13C, which is a through hole. A bolt 13D fastening the upper channel member 13B to the lower hinge bracket 63A is exposed below by the work hole. Therefore, through the work hole 13C, the worker can perform work to fasten the upper channel member 13B to the lower hinge bracket 63A.

Figure 11:
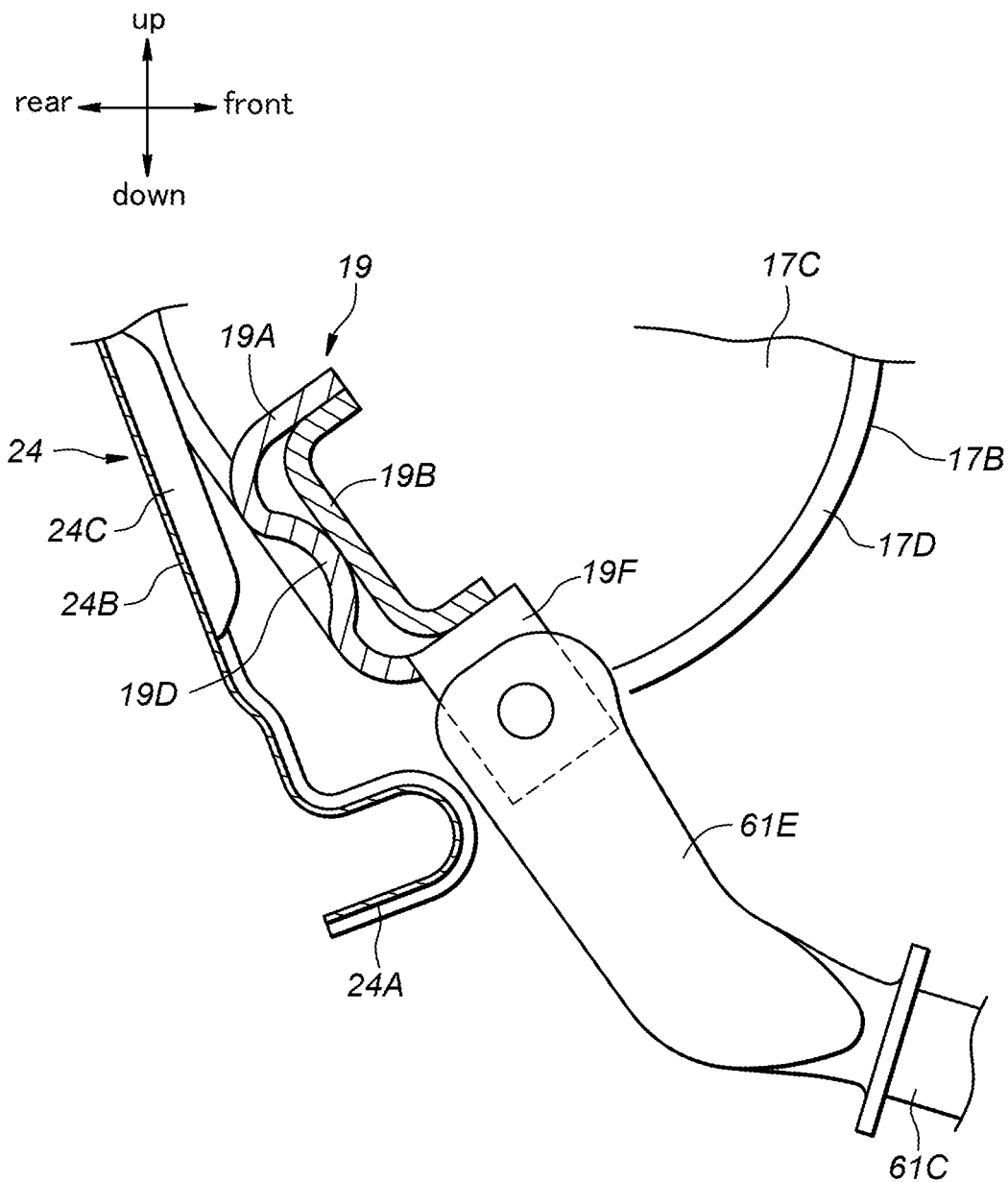
FIG. 11 is a sectional view showing a connection part between the lower member and the reclining drive unit according to a modified embodiment.

A bracket 64 extending downward is welded to the lower member 19 of the seat back frame 16. Preferably, the bracket 64 is welded to an outer surface of the lower side wall of the rear channel member 19A of the lower member 19. The tip of the ball screw shaft 61C is joined to the bracket 64 to be pivotable about a laterally extending axis. In another embodiment, as shown in FIG. 11, the tip of the ball screw shaft 61C may he provided with a bent part 61E that is bean upward. Preferably, the bent part 61E is joined to a coupling part 19F formed integrally with the rear channel member 19A to be pivotable about a laterally extending axis. The coupling part 191' is preferably formed by cutting and raising the rear channel member 19A, for example.

Figure 12:
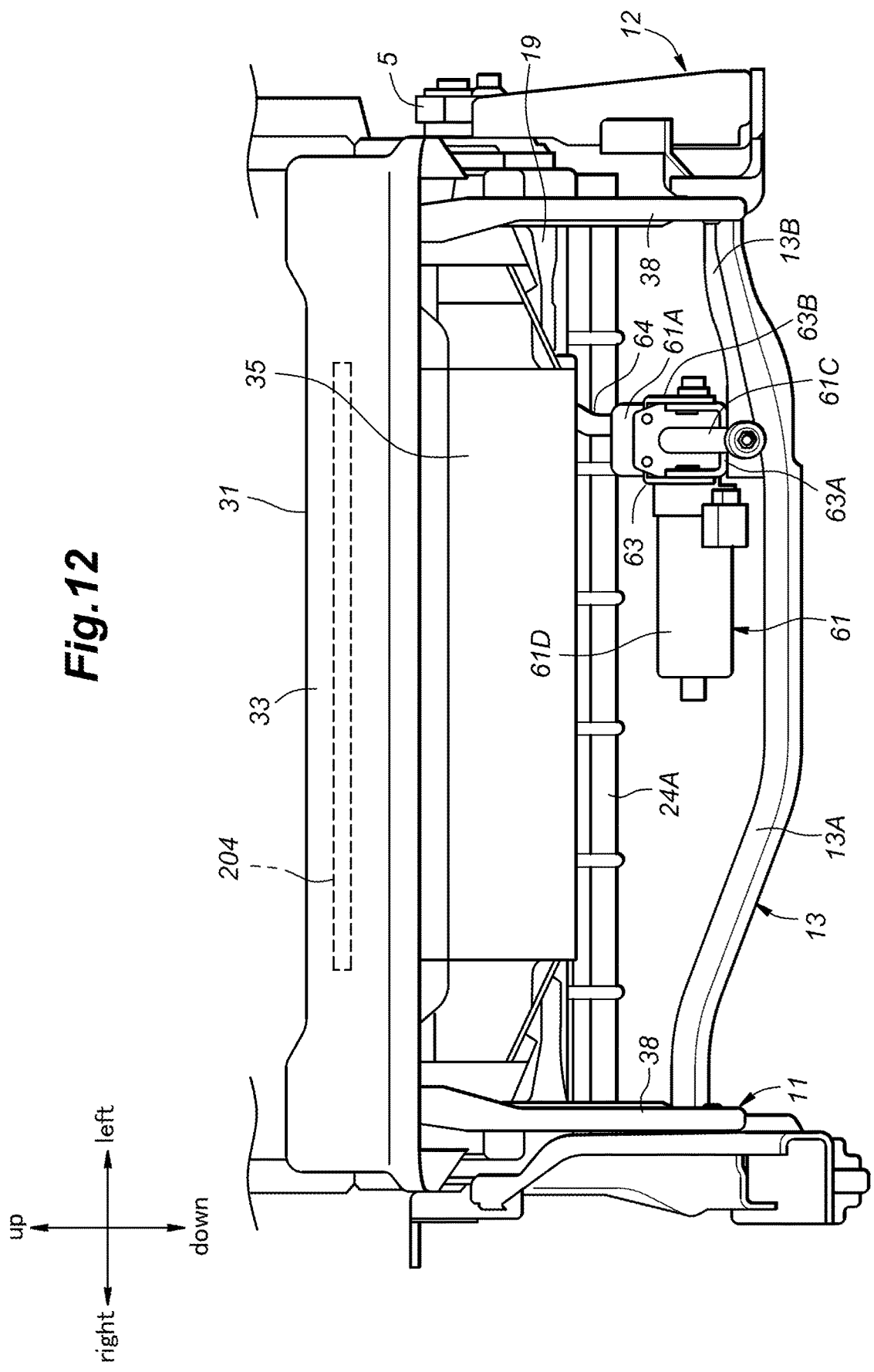
FIG. 12 is a front view of a lower portion of the vehicle seat.

As shown in FIGS. 5 and 12, the reclining drive unit 61 is disposed more rearward than the front end of the seat cushion 2. Specifically, the reclining drive unit 61 is provided on the base cross member 13 positioned more rearward than the front member 33 of the seat cushion frame 31. The reclining drive unit 61 is disposed on the left part of the base cross member 13. The axis the ball screw shaft 61C extends in the front-rear direction. The axis of the ball screw shaft 61C perpendicularly crosses the rotation shaft of the reclining electric motor 61D in plan view. Due to this configuration, the front end of the reclining drive unit 61 is disposed more rearward than the front member 33 of the seat cushion 2, and therefore, it is possible to prevent the legs of the seated person from contacting the reclining electric motor 61D.

The reclining electric motor 61D is disposed more rearward than the base cross member 13. The rotation shaft of the reclining electric motor 61D extends laterally and substantially in parallel with the base cross member 13. The front end of the reclining electric motor 61D is spaced from the base cross member 13. Due to this configuration, the distance between the reclining electric motor 61D and the seat back 3 can be made short and the ball screw shaft 61C can be made short. Therefore, the reclining drive unit 61 can be made compact.

The upper wall portion of the reclining electric motor 61D may be located higher than an upper portion of a right part of the base cross member 13. The upper wall portion of the reclining electric motor 61D may be located on the same horizontal plane as the upper portion of the right part of the base cross member 13. The upper wall portion of the reclining electric motor 61D may he located lower than the upper portion of the right part of the base cross member 13. Due to this configuration, the reclining electric motor 61D and the base cross member 13 can be arranged compactly.

Figure 9:
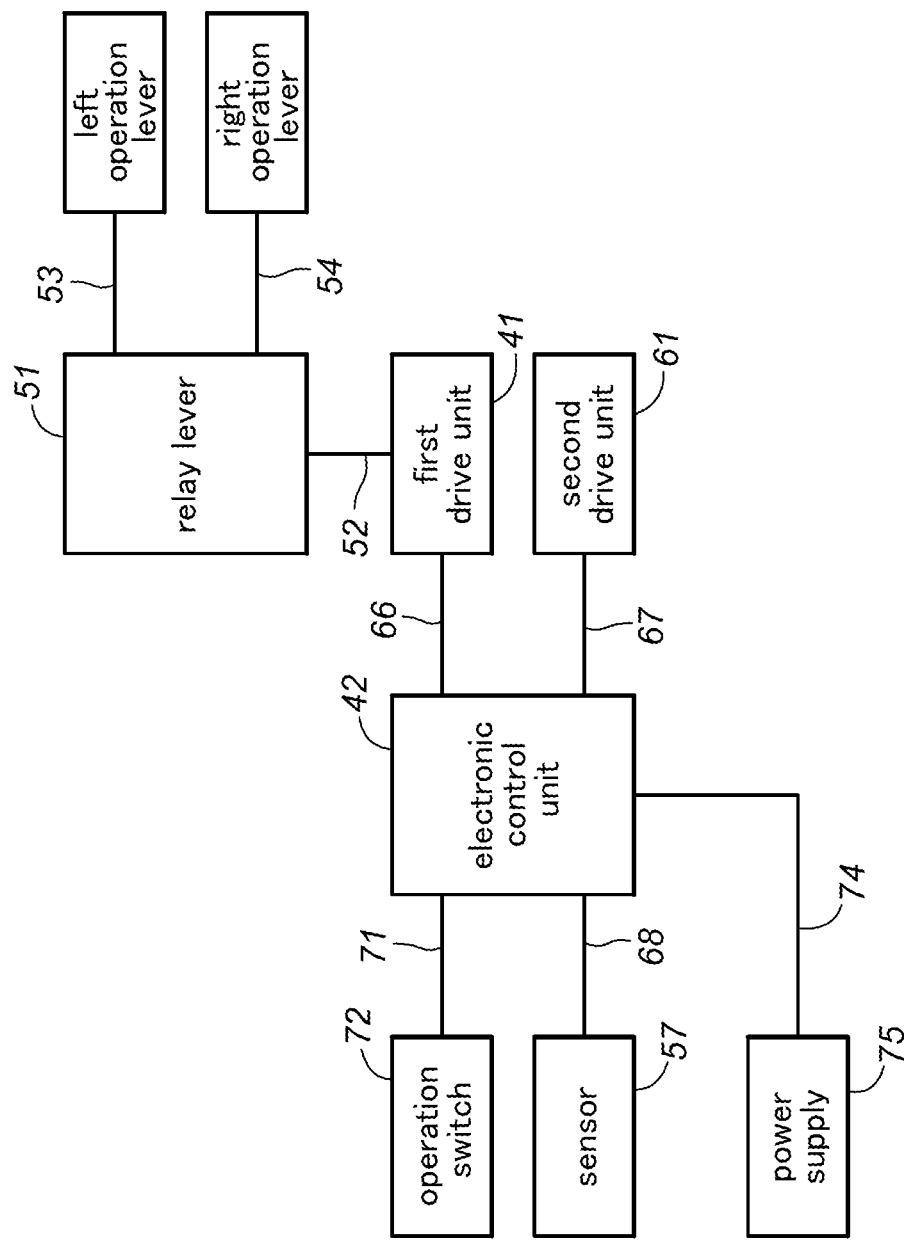
FIG. 9 is an explanatory diagram for showing a connection structure between a control cable and a harness.

As shown in FIGS. 4 and 9, the electronic control unit 42 is connected to the lock device drive unit 41 by a first harness 66, to the reclining drive unit 61 by a second harness 67, and to the sensor 57 by a third harness 68. The first to third harnesses 66 to 68 are tied up at a part. A part of the second harness 67 is fastened to the lower member 19 by multiple resin fasteners 69 to be disposed along the lower member 19. In another embodiment, a part of the second harness 67 may be fastened to the third cross member 23 by the multiple resin fasteners 69 to be disposed along the third cross member 23.

Further, the electronic control unit 42 is connected to an operation switch 72 by a fourth harness 71 and to a power supply 75 by a fifth harness 74. The operation switch 72 outputs a first signal in response to a first operation of the occupant and outputs a second signal in response to a second operation of the occupant. The first signal is a signal corresponding to an operation for changing the vehicle seat 1 from the use form to the stowed form, and the second signal is a signal corresponding to an operation for changing the vehicle seat 1 from the stowed form to the use form.

Next, an operation of the vehicle seat 1 will be described. As shown in FIG. 10(A), when the vehicle seat 1 is in the use form, the seat back 3 stands upright relative to the floor 4, and the lock devices 5 restrict pivoting of the seat back 3. The seat cushion 2 extends substantially horizontally and is disposed to be spaced from the floor 4. if the occupant performs the first operation on the operation switch 72 when the vehicle seat 1 is in the use form, the first signal is outputted to the electronic control unit 42. The electronic control unit 42 drive-controls the lock device drive unit 41 according to the first signal. Consequently, the lock device drive unit 41 moves the relay lever 51 from the initial position to driving position with the first control cable 52. When the relay lever 51 moves from the initial position to the driving position, the second control cable 53 and the third control cable 54 pull the left and right operation levers 5B, and the left and right operation levers 5B move from the lock position to the release position. Thereby, the left and right lock devices 5 are unlocked and the seat back 3 becomes pivotable relative to the base 7.

When the right operation lever 5B reaches the release position, the sensor 57 is pressed by the projection 5C of the operation lever 5B and outputs a detection signal to the electronic control unit 42. Based on the signal from the sensor 57, the electronic control unit 42 determines that the operation lever 5B has reached the release position, namely, the lock devices 5 are unlocked. When it is determined that the lock devices 5 are unlocked, the electronic control unit 42 drive-controls the reclining electric motor 61D of the reclining drive unit 61 to cause the reclining drive unit 61 to extend. Upon rotation of the reclining electric motor 61D, the ball screw nut 61B rotates relative to the case 61A and the ball screw shaft 61C protrudes rearward relative to the case 61A. Thereby, as shown in FIG. 10(B), the lower end portion of the seat back 3 is pushed rearward by the reclining drive unit 61, and the upper portion of the seat hack 3 pivots forward. At the same time, the seat cushion 2 is pushed by the seat back 3 and moves forward and downward. Thereby, the vehicle seat 1 is put in the stowed form. When the electronic control unit 42 detects that the ball screw shaft 61C has reached the maximum-length position based on the drive current of the reclining electric motor 61D of the reclining drive unit 61, the electronic control unit 42 stops driving of the reclining drive unit 61. Also, the electronic control unit 42 measures an elapsed time from when it is determined that the lock devices 5 are unlocked, and stops driving of the lock device drive unit 41 when the elapsed time reaches a predetermined time. Consequently, due to the urging force of the springs of the left and right lock devices 5, the lock devices 5 change from the unlocked state to the locked state. Thereby, the vehicle seat 1 is maintained in the stowed form as shown in FIG. 10(C).

If the occupant performs the second operation on the operation switch 72 when the vehicle seat 1 is in the stowed form, the second signal is outputted to the electronic control unit 42. The electronic control unit 42 drive-controls the lock device drive unit 41 according to the second signal. Consequently, the lock device drive unit 41 moves the left and right operation levers 5B from the lock position to the release position via the first control cable 52, the relay lever 51, the second control cable 53, and the third control cable 54. Thereby, the left and right lock devices 5 are unlocked and the seat back 3 becomes pivotable relative to the base 7.

Based on the signal from the sensor 57, the electronic control unit 42 determines that the operation lever 5B has reached the release position, namely, the lock devices 5 are unlocked. When it is determined that the lock devices 5 are unlocked, the electronic control unit 42 drive-controls the reclining electric motor 61D of the reclining drive unit 61 to cause the reclining drive unit 61 to contract. Upon rotation of the reclining electric motor 61D, the ball screw nut 61B rotates relative to the case 61A and the ball screw shaft 61C moves forward relative to the case 61A. Thereby, as shown in FIG. 10(B), the lower end portion of the seat back 3 is pulled forward by the reclining drive unit 61, and the upper portion of the seat back 3 pivots rearward. At the same time, the seat cushion 2 is pulled by the seal back 3 and moves rearward and upward. Thereby, the vehicle seat 1 is put in the use form. When the electronic control unit 42 detects that the ball screw shaft 61C has reached the minimum-length position based on the drive current of the reclining electric motor 61D of the reclining drive unit 61, the electronic control unit 42 stops driving of the reclining drive unit 61. Also, the electronic control unit 42 measures an elapsed time from when it is determined that the lock devices 5 are unlocked, and stops driving of the lock device drive unit 41 when the elapsed time reaches a predetermined time. Consequently, due to the urging force of the springs of the left and right lock devices 5, the lock devices 5 change from the unlocked state to the locked state. Thereby, the vehicle seat I is maintained in the use form as shown in FIG. 10(A).

In the vehicle seat 1 according to the embodiment, the electronic control unit 42 can be disposed at a position where it would not hinder operation of the vehicle seat 1. With the electronic control unit 42 disposed on the seat back 3, the thickness of the seat cushion 2 can be reduced. Also, a space for movement of the seat cushion 2 can be secured below the seat cushion 2. Further, influence of the electronic control unit 42 and the lock device drive unit 41 on the back of the occupant can be reduced.

The first bracket 44 for supporting the electronic control unit 42 is disposed to overlap with the planar part 24B and the ridges 24C of the plate member 24. Therefore, the first bracket 44 is disposed on a part of the plate member 24 having high stiffness, and the first bracket 44 and the electronic control unit 42 are supported on the seat back frame 16 stably.

The electronic control unit 42 is disposed in the corner defined by the upper member 18 and the back side member 17. Also, the electronic control unit 42 is disposed in the space defined by the upper member 18, the back side member 17, the first cross member 21, and the headrest pillar. Accordingly, the electronic control unit 42 can be disposed by effectively using the space formed by the upper member 18, the back side member 17, and the plate member 24. Also, influence of the electronic control unit 42 on the back of the occupant can be reduced.

Since the lock device drive unit 41 is disposed below the electronic control unit 42, the electronic control unit 42 and the lock device drive unit 41 can be arranged in the seat back 3 in a space-efficient manner. Also, since the first cross member 21 is disposed between the electronic control unit 42 and the lock device drive unit 41, it is possible to improve the stiffness of the part of the seat back frame 16 where the electronic control unit 42 and the lock device drive unit 41 are mounted. Since the end portion 21A of the first cross member 21 joined to the back side member 17 is bent upward, interference with the second bracket 46 joined to the back side member 17 can be avoided.

A vehicle seat 200 according to the second embodiment differs from the vehicle seat 1 according to the first embodiment with respect to the structure around the reclining drive unit 61. In the following description, only the configuration that differs will be explained, and explanation will be omitted regarding the configuration same as that of the vehicle seat 1 according to the first embodiment, for which the foregoing description should be referred to.

Figure 13:
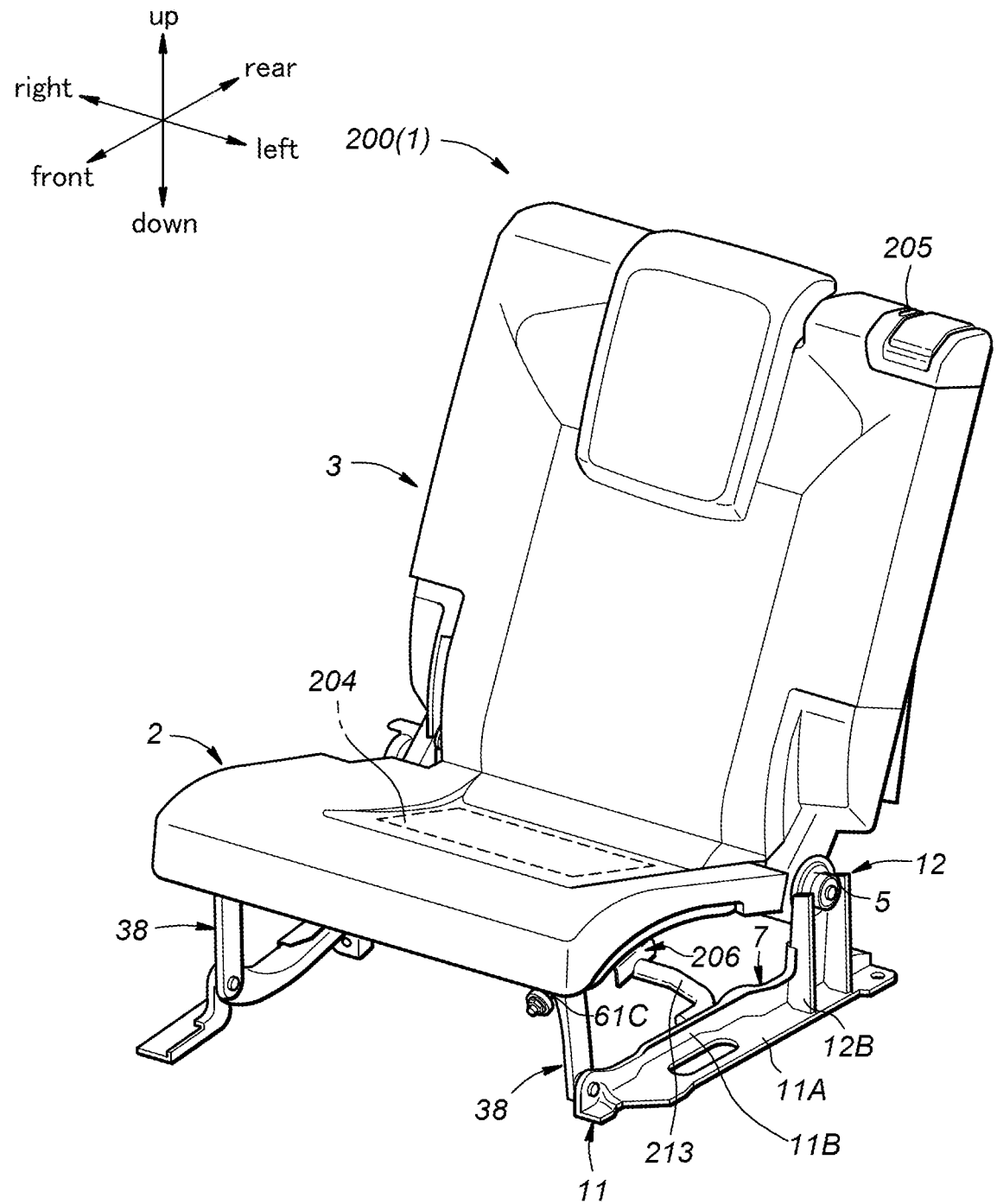
FIG. 13 is a perspective view of the vehicle seat.
Figure 14:
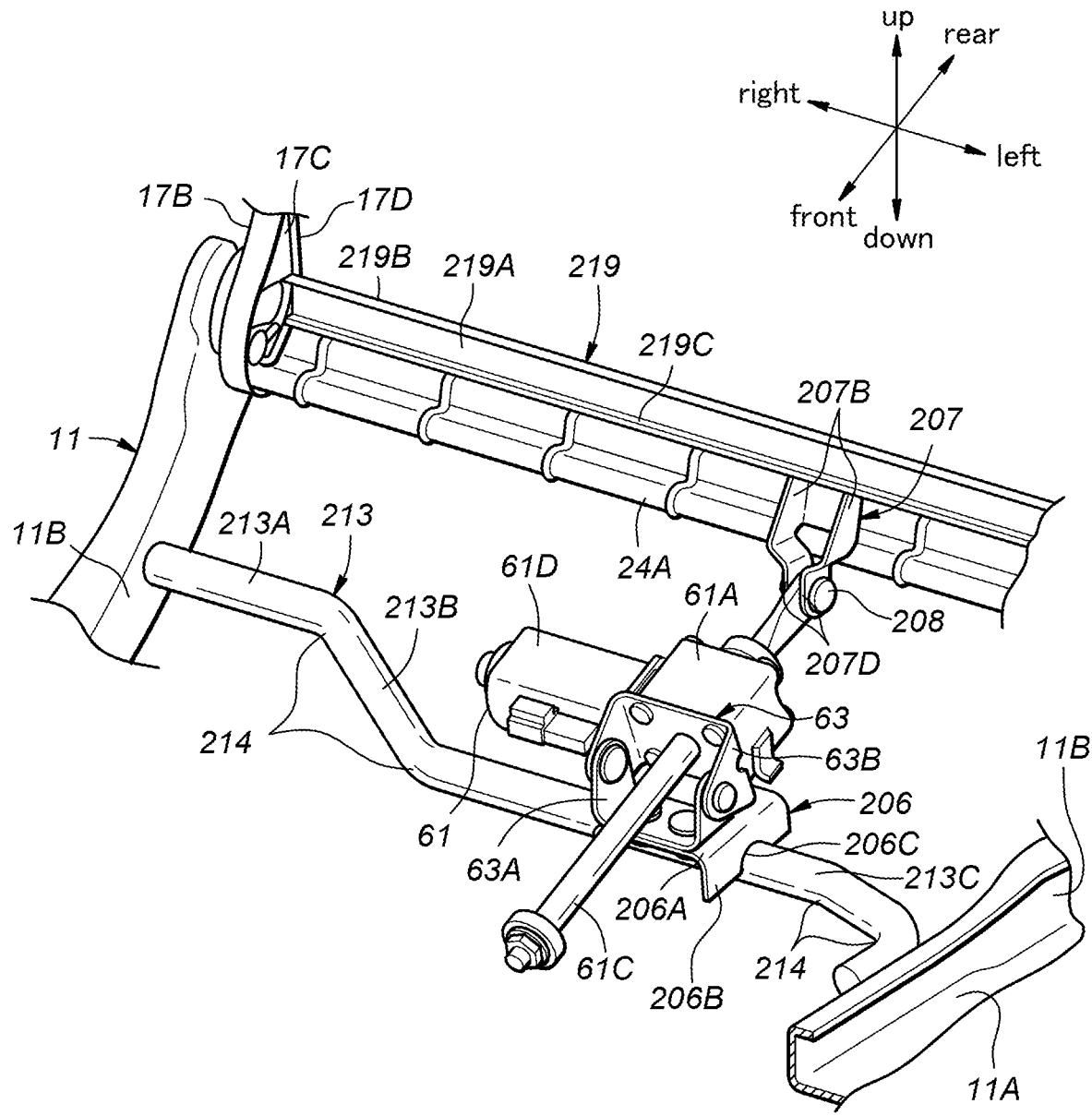
FIG. 14 is a perspective view showing a base cross member and a structure around it according to the second embodiment.

As shown in FIGS. 13 and 14, in the vehicle seat 200 according to this embodiment, the base cross member 213 is formed of a pipe member having at least one bent part 214. The left and right end portions of the base cross member 213 are joined to the vertical wall portions 11B of the corresponding base side members 11. The base cross member 213 is sectioned by multiple bent parts 214, and includes a right part 213A, a central part 213B, and a left part 213C. The right part 213A, the central part 213B, and the left part 213C each extend linearly. The right part 213A is disposed higher than the left part 213C. The central part 213B is inclined upward toward the right. The left part 213C is formed longer in the lateral direction than the right part 213A.

A bracket 206 is attached to the left part 213C of the base cross member 213. The bracket 206 includes a main body 206A having a vertically facing surface and left and right side wall portions 206B extending downward from the left and right side edges of the main body 206A. The lower end of each side wall portion 206B is formed with a semi-circular recess 206C. The recess 206C receives an upper portion of the base cross member 213, which is welded. The lower hinge bracket 63A is fastened to the main body 206A of the bracket 206. Due to this configuration, the configuration of the base cross member 213 can be simplified and the stiffness of the same can be improved. Also, the reclining drive unit 61 can be fixed to the base cross member 213 having a curved surface via the bracket 206.

The lower member 219 of the seat back frame 16 is formed of a channel member having a groove-shaped cross section that opens forward. The lower member 219 includes a side wall portion 219A that has a surface facing in the front-rear direction, an upper wall portion 219B extending forward from the upper edge of the side wall portion 219A, and a lower wall portion 219C extending forward from the lower edge of the side wall portion 219A. The width of the side wall portion 219A in the up-down direction is wider than the width of the upper wall portion 219B in the front-rear direction, and the width of the side wall portion 219A in the up-down direction is wider than the width of the lower wall portion 2190 in the front-rear direction. The left and right end portions of the side wall portion 219A of the lower member 219 are welded to the inner sides of the edge wall portions 17D of the laterally corresponding side member lower portions 17B. Due to this configuration, the lower member 219 is joined to the back side members 17 at the side wall portion 219A having a width wider than those of the upper wall portion 219B and the lower wall portion 219C, whereby the stiffness of the joint can be improved.

As shown in FIGS. 14 and 15, a bracket 207 is attached to the lower member 219. The bracket 207 includes a rear wall portion 207A that has a surface facing in the front-rear direction and left and right edge wall portions 207B extending forward from the left and right side edges of the rear wall portion 207A. The rear wall portion 207A and the left and right edge wall portions 207B are formed by bending a sheet metal. The upper end portion 207C of the rear wall portion 207A extends higher than the upper end portions 207C of the left and right edge wall portions 207B and is in surface contact with the rear surface of the side wall portion 219A of the lower member 219. The upper end portion 207C of the rear wall portion 207A is welded to the rear surface of the side wall portion 219A of the lower member 219. The upper end portions 207C of the left and right edge wall portions 207B are in contact with and welded to the lower surface of the lower wall portion 219C of the lower member 219. The edge wall portions 207B of the bracket 207 extend downward and forward. The left and right edge wall portions 207B have laterally facing surfaces and oppose each other in the lateral direction via a gap. The left and right edge wall portions 207B are bent at vertically intermediate part so that the distance between the lower end portions 207D thereof is smaller than the distance between the upper end portions 207C thereof. The lower end portions 207D of the left and right edge wall portions 207B are each formed with a support hole 207E. that laterally penetrates therethrough. A shaft 208 is inserted in the support holes 207E. The rear end portion of the ball screw shaft 61C is disposed between the left arid right edge wall portions 207B and is pivotably supported on the shaft 208. Since the bracket 207 extends downward and forward, the bracket 207 can make the ball screw shaft 61C stored compactly under the seat back 3 when the vehicle seat 200 is put in the stowed form.

Figure 16:
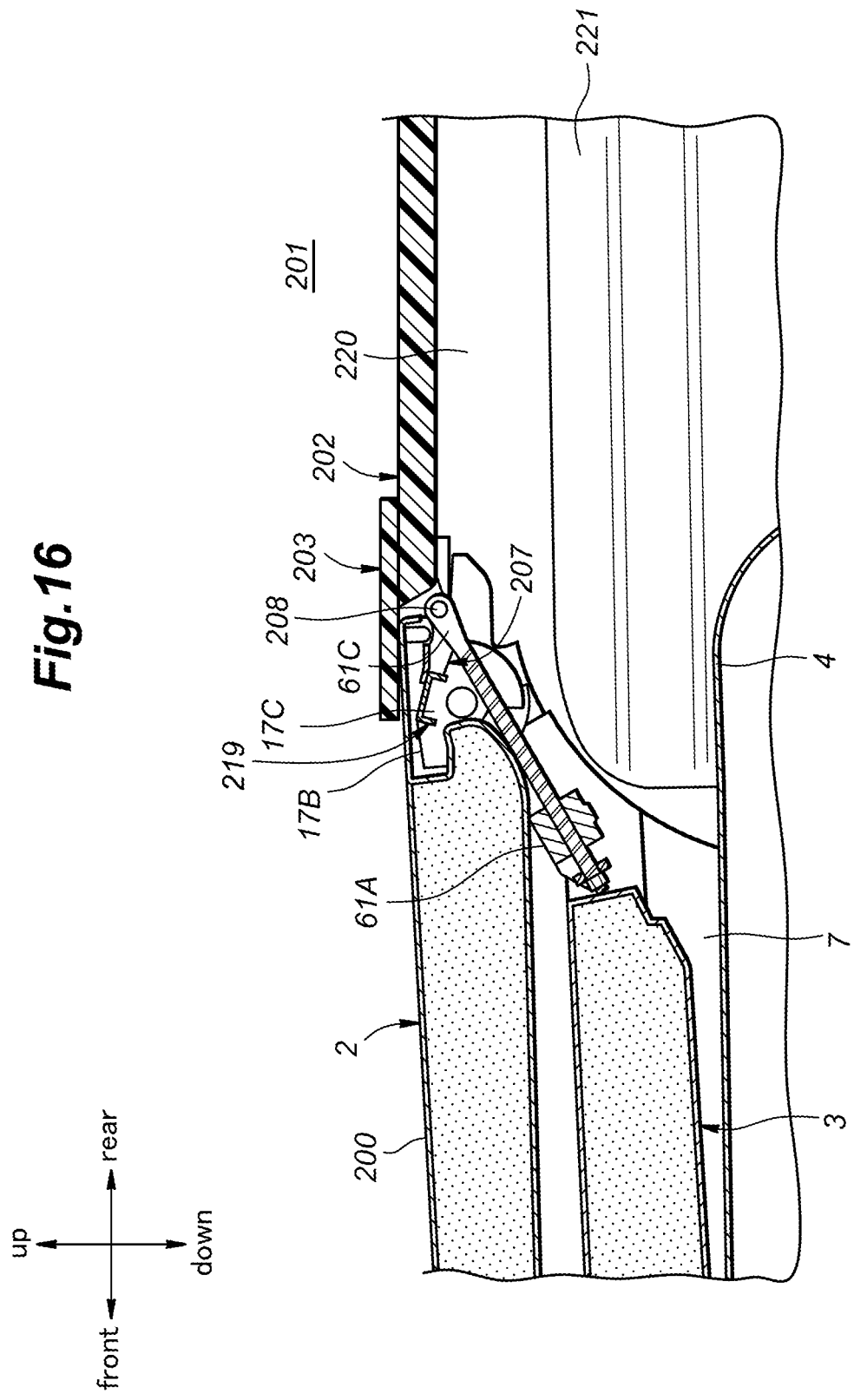
FIG. 16 is a sectional view showing a main part of the seat in the stowed form.

As shown in FIG. 16, a cargo room 201 is provided in a part of the automobile behind the vehicle seat 200. A part of the floor 4 defining the lower portion of the cargo room 201 is provided with a recess 220 that is recessed downward. An article 221 such as a tire can be stored in the recess 220. On the upper surface of the floor 4, a cargo room board 202 is provided so as to cover the recess 220. The cargo room board 202 is provided to be detachable from the floor 4 and extends horizontally. The cargo room hoard 202 is made of resin, for example.

A cover 203 is provided at the front edge of the cargo room hoard 202. The cover 203 extends in the lateral direction of the vehicle seat 200. When the vehicle seat 200 is in the stowed form, the front end of the cover 203 is disposed on the rear surface of the seat back 3. Namely, the cover 203 is provided to cover the gap between the cargo room board 202 and the seat back 3. The cover 203 may be molded integrally with the cargo room hoard 202. When the vehicle seat 200 is in the stowed form, the cover 203 is disposed above the rear end of the ball screw shaft 61C. When the vehicle seat 200 is in the use form, the bracket 207 extends forward and downward. Therefore. the bracket 207 and the rear end of the ball screw shaft 61C are prevented from contacting the cover 203 when the vehicle seat 200 is in the stowed form. Due to this configuration, when the vehicle seat 200 is in the stowed form, the cover 203 can hide the gap between the vehicle seat 200 and the cargo room board 202 as well as the rear end of the ball screw shaft 61C.

As shown in FIG. 13, a sensor 204 is provided on the upper portion of the seat cushion 2. Specifically, the sensor 204 is disposed between the upper surface of the pad constituting the seat cushion 2 and the skin member. The sensor 204 is a load sensor for detecting a load. For example, the sensor 204 may he a piezoelectric element, a membrane switch that deforms according to the load so that contacts are closed, or the like. The sensor 204 is provided to detect whether there is an object on the seat cushion 2. In the present embodiment, the sensor 204 is a membrane switch and outputs an ON signal when a load greater than or equal to a predetermined value is applied.

The sensor 204 is connected to the electronic control unit 42. The sensor 204 outputs a signal to the electronic control unit 42 according to the detected pressure. When the electronic control unit 42 determines that there is an object on the seat cushion 2 based on the signal from the sensor 204, the electronic control unit 42 restricts deformation from the use form to the stowed form. Specifically, the electronic control unit 42 prohibits driving of the lock device drive unit 41 when the electronic control unit 42 receives the ON signal from the sensor 204. Due to this configuration, it is possible to prevent the vehicle seat 200 from changing to the stowed form in a state in which an object is place on the seat cushion 2 or in a state in which there is a seated person.

Figure 17:
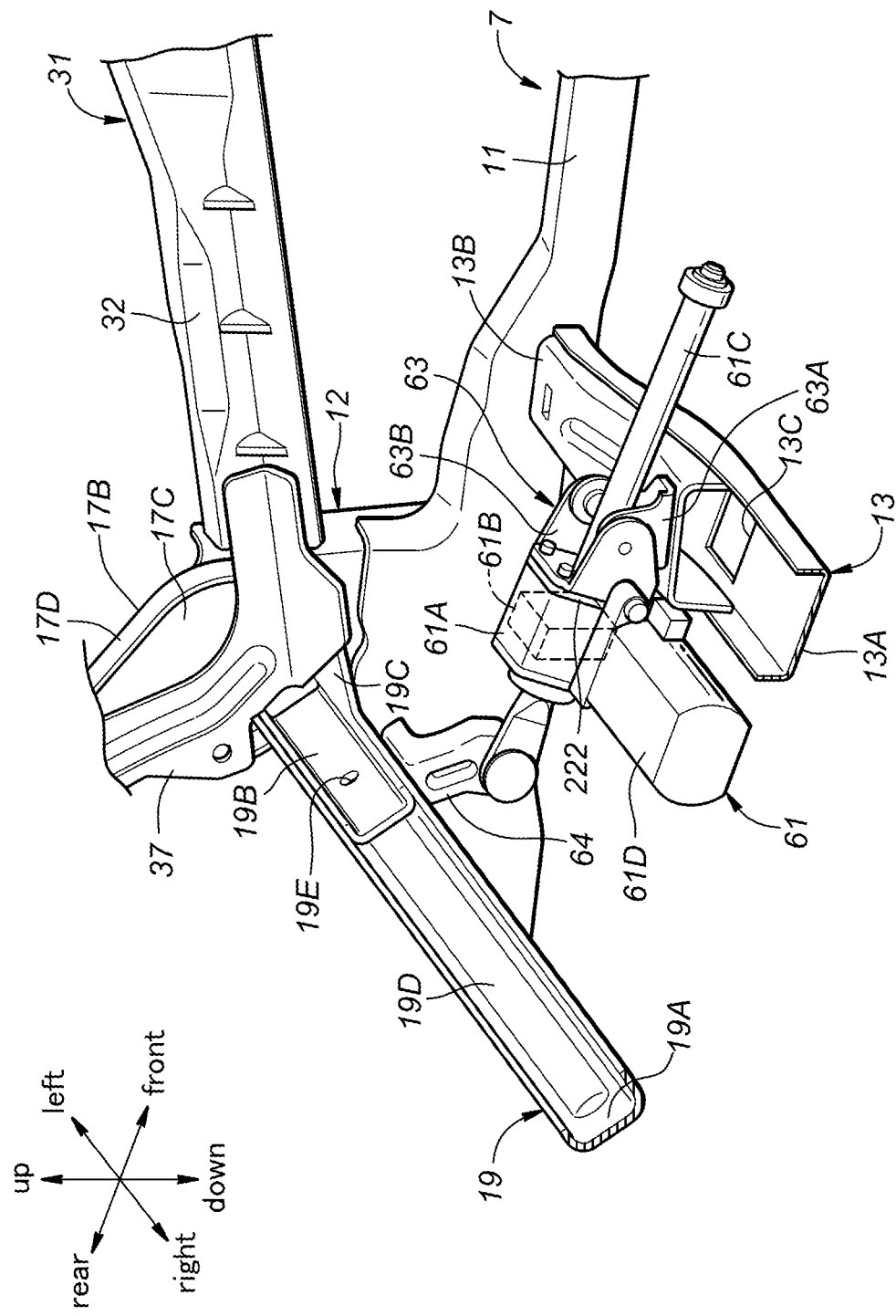
FIG. 17 is a perspective view of a reclining drive unit provided with a strain sensor.

Also, in place of the sensor 204, another sensor may be used to detect pinching of an object between the seat cushion 2 and the seat back 3. For example, as shown in FIG. 17, the sensor 204 may be a strain sensor 222 provided between the upper hinge bracket 63B and the case 61A. The strain sensor 222 is a known strain sensor and outputs a signal according to the strain to the electronic control unit 42. When an object is pinched between the seat cushion 2 and the seat back 3, movement of the seat back 3 relative to the seat cushion 2 is restricted. At this time, the ball screw shaft 61C is urged to move rearward relative to the case 61A, and therefore, the strain sensor 222 is compressed between the upper hinge bracket 63B and the case 61A. Therefore, the electronic control unit 42 can detect pinching of an object between the seat cushion 2 and the seat back 3 according to the signal from the strain sensor 222, By using the strain sensor 222, it is possible to omit the sensor 204 and to simplify the structure of the seat cushion 2. In another embodiment, the electronic control unit 42 may detect pinching of an object between the seat cushion 2 and the seat back 3 based on an electric current flowing through the reclining electric motor 61D.

The vehicle seat 200 is provided with an indicator 205. For example, the indicator 205 is a display device including LEDs and the like, Preferably, the indicator 205 is disposed on the upper end of the left side of the seat back 3. The indicator 205 is connected to the electronic control unit 42. The electronic control unit 42 turns on the indicator 205 when the ball screw shaft 61C is in the maximum-length and the operation lever 5B is in the initial position. Due to this configuration, the user can visually confirm that the vehicle seat 200 has completely changed to the stowed form. In another embodiment, the electronic control unit 42 may turn on the indicator 205 when the operation lever 5B is not in the initial position, In this case, the user can visually confirm that the lock devices 5 are in the unlocked state.

A manufacturing method of the vehicle seat 1, 200 preferably includes a step of providing the seat back 3 on the base 7 in a pivotable manner, a step of providing the seat cushion 2 on the seat back 3 in a pivotable manner, and a step of connecting the reclining drive unit 61 for making the seat hack 3 pivot relative to the base 7 to the base 7 and the seat back 3 such that the reclining drive unit 61 is provided more rearward than the front end of the seat cushion 2. According to this aspect, the vehicle seat 1, 200 provided with the reclining drive unit 61 can be unitized. Thereby, installation of the vehicle seat 1, 200 to the vehicle becomes easy.

A vehicle seat 300 according to the third embodiment differs from the vehicle seat 1, 200 according to the first embodiment and the second embodiment with respect to the interior structure of the seat cushion 2. In the following description, only the configuration that differs will be explained, and explanation will be omitted regarding the configuration same as that of the vehicle seat 1 according to the first embodiment, for which the foregoing description should be referred to.

Figure 18:
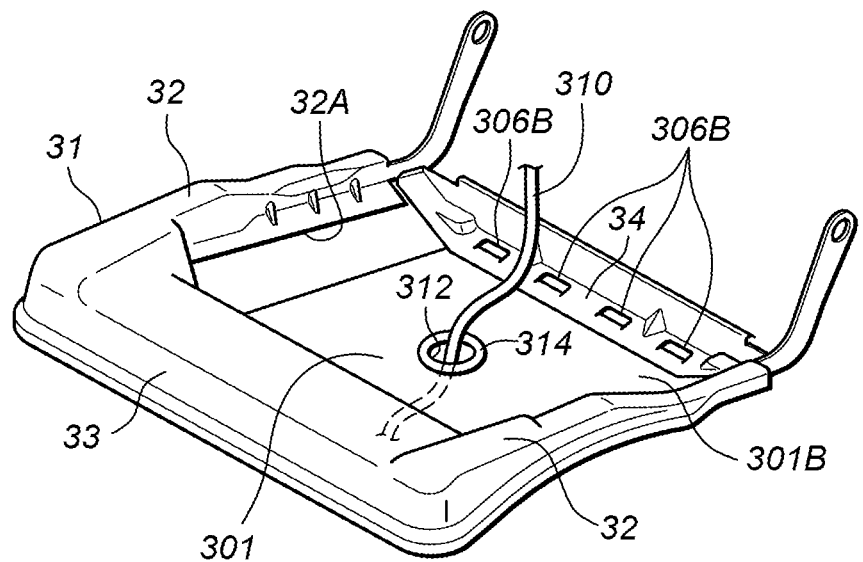
FIG. 18 is a perspective view of an inside of a seat cushion according to the third embodiment.
Figure 19:
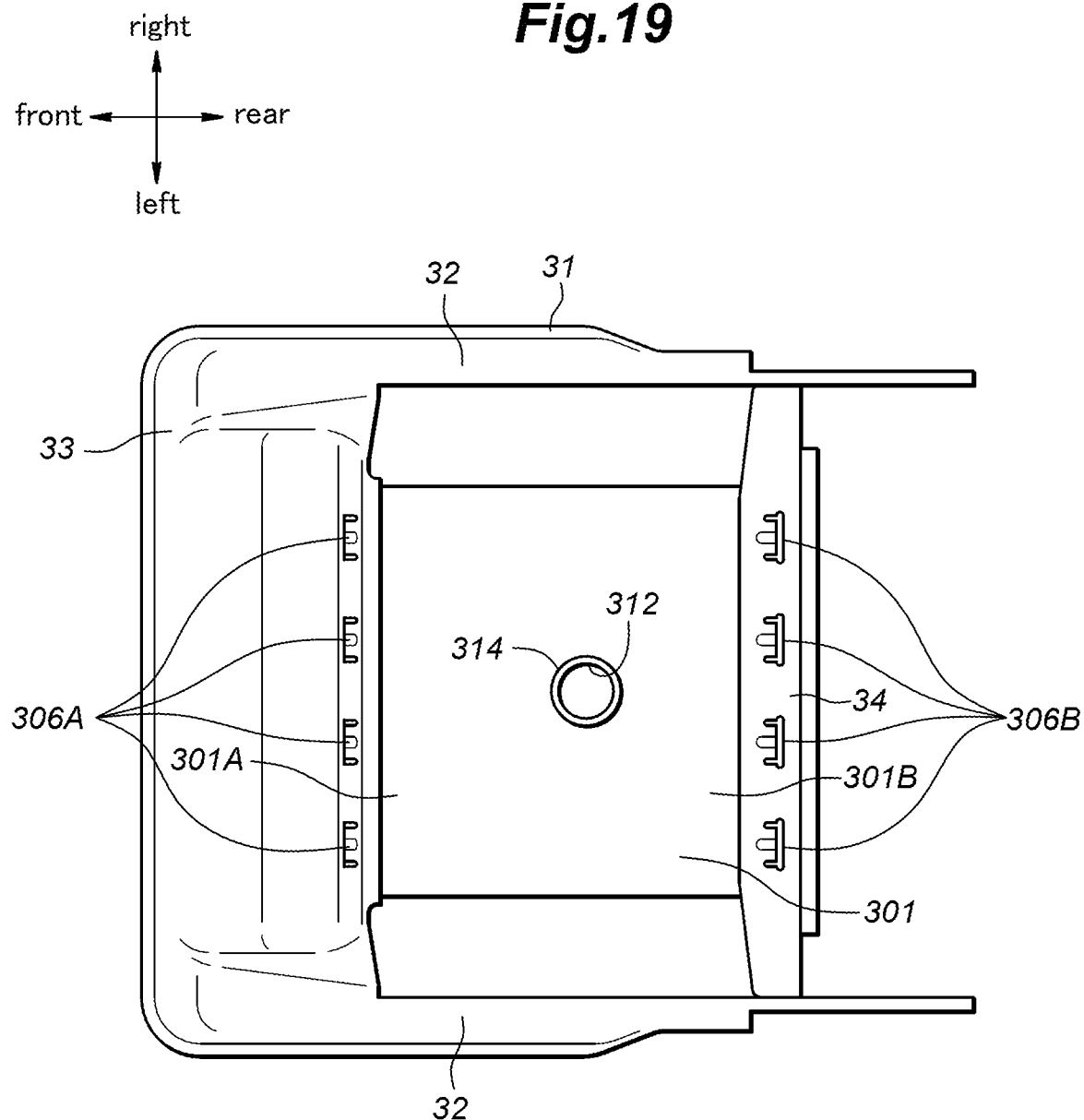
FIG. 19 is a plan view of the inside of the seat cushion according to the third embodiment.

As shown in FIGS. 18 and 19, the vehicle seat 300 includes a sheet-shaped member 301 instead of the center plate 35. The sheet-shaped member 301 extends in the front-rear direction to span between the front member 33 and the rear member 34. The sheet-shaped member 301 has a vertically facing surface and the front edge 301A and the rear edge 301B thereof extends laterally. The sheet-shaped member 301 has flexibility and is preferably formed of a woven fabric, for example. The sheet-shaped member 301 is preferably formed of PET resin, for example.

A reinforcement thread 302 may be sewn on the sheet-shaped member 301. The reinforcement thread 302 improves the tensile strength of the sheet-shaped member 301. For example, the reinforcement thread 302 preferably includes left and right side parts 302A extending in the front-rear direction and a central part 302B extending from the front end of one of the side parts 302A to the rear end of the other of the side parts 302A. Preferably, the left and right side parts 302A and the central part 302B are formed linearly so that the reinforcement thread 302 is arranged in an N shape.

Figure 20:
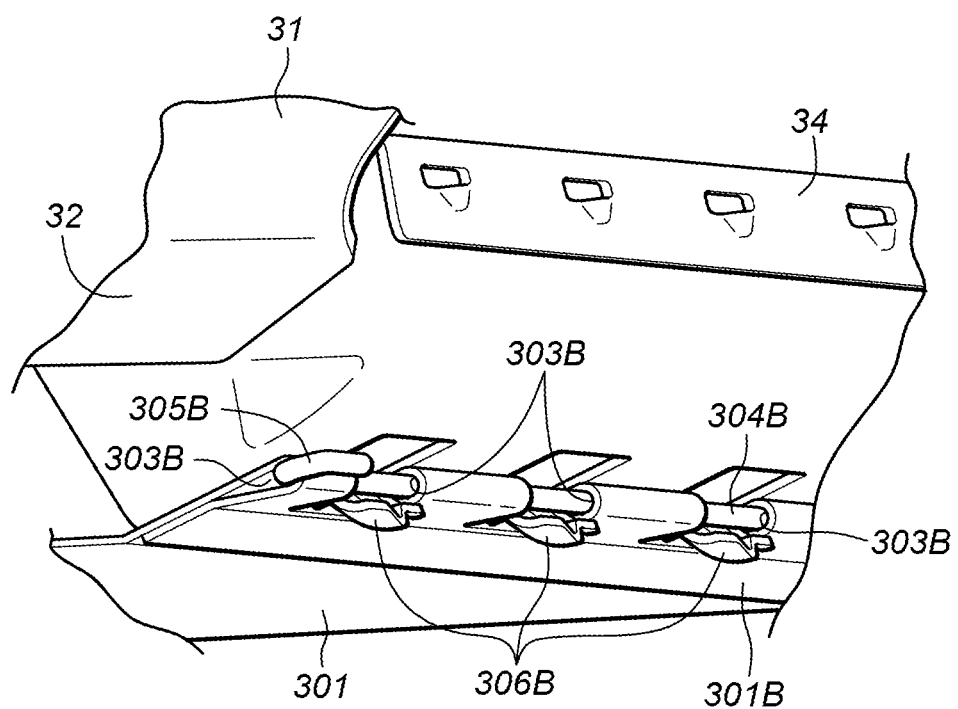
FIG. 20 is a perspective view of a seat cushion frame according to the third embodiment as seen from below and behind, showing a connection part between a sheet-shaped member and a lower member.
Figure 21:
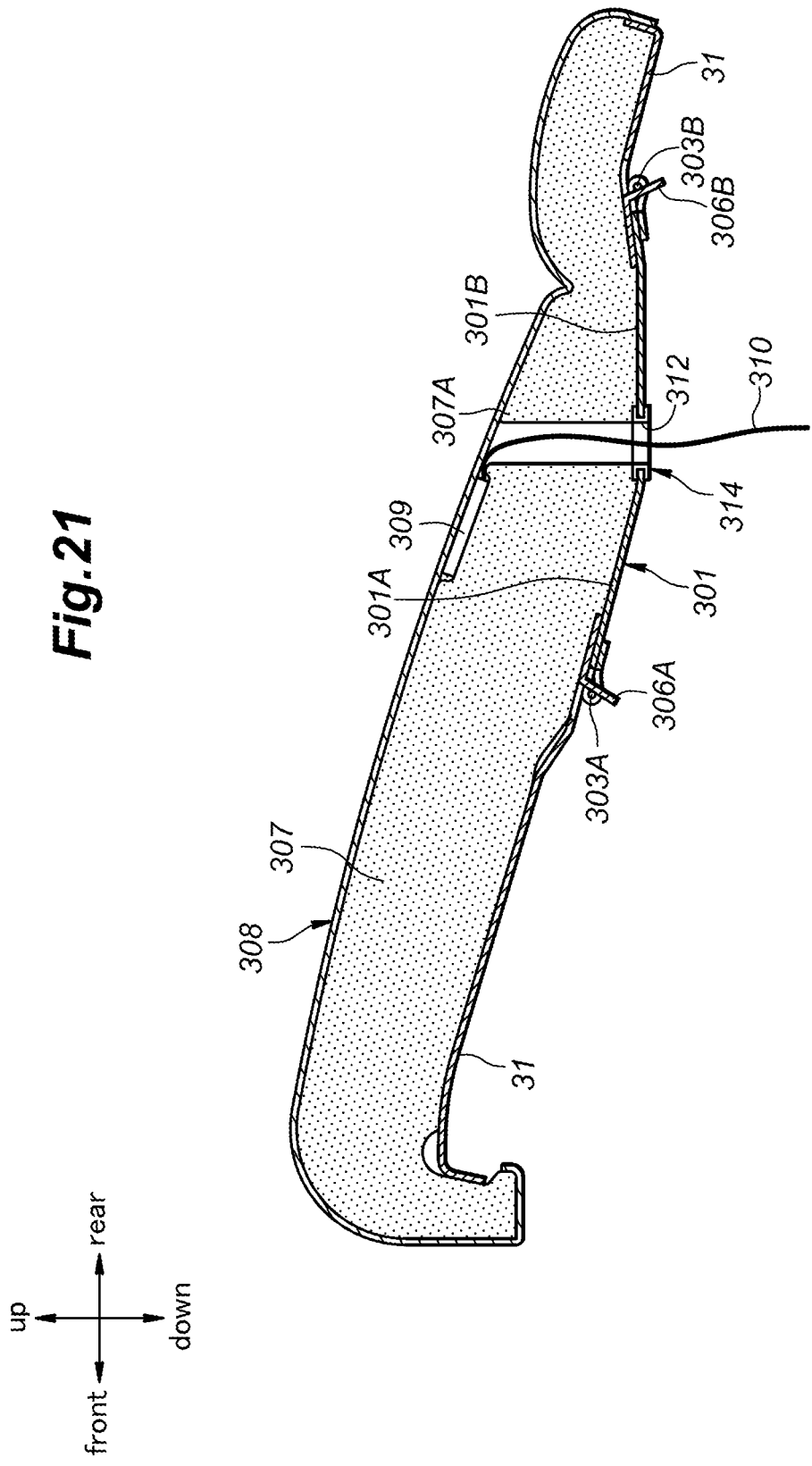
FIG. 21 is a sectional view of the seat cushion according to the third embodiment.

As shown in FIGS. 20 and 21, the front edge 301A of the sheet-shaped member 301 has tubular multiple front retaining holes 303A that extend laterally. Preferably, the front retaining hole 303A are formed by folding back the front edge 301A of the sheet-shaped member 301 and sewing it onto the main body of the sheet-shaped member 301. Gaps are formed between adjoining ones of the front retaining holes 303A, A front shaft 304A that extends laterally is inserted in each of the front retaining holes 303A. The front shaft 304A includes, at each of the left and right ends thereof, a bent part 305A that is bent forward. The bent parts 305A determine the lateral position of the front shaft 304A relative to each front retaining hole 303A.

The rear edge 301B of the sheet-shaped member 301 has tubular multiple rear retaining holes 303B that extend laterally. Preferably, the rear retaining holes 303B are formed by folding back the rear edge 301B of the sheet-shaped member 301 and sewing it onto the main body of the sheet-shaped member 301. Gaps are formed between adjoining ones of the rear retaining holes 303B. A rear shaft 304B that extends laterally is inserted in each of the rear retaining holes 303B. The rear shaft 304B includes, at each of the both left and right ends thereof, a bent part 305B that is bent rearward. The bent parts 305B determines the lateral position of the rear shaft 304B relative to each rear retaining hole 303B.

The front member 33 includes multiple front locking parts 306A. The multiple front locking parts 306A are arranged in the lateral direction. Preferably, each front locking part 306A is a projecting piece extending forward and downward from the front member 33. Preferably, each front locking part 306A is formed by cutting and bending the front member 33 downward. The rear member 34 includes multiple rear locking parts 306B. The multiple rear locking parts 306B are arranged in the lateral direction. Preferably, each rear locking part 306B is a projecting piece extending rearward and downward from the rear member 34. Preferably, each rear locking part 306B is formed by cutting and bending the rear member 34 downward.

The front shaft 304A is exposed to the outside between the front retaining holes 303A and is locked by the multiple front locking parts 306A. Similarly, the rear shaft 304B is exposed to the outside between the rear retaining holes 303B and is locked by the multiple front locking parts 306A. Preferably, the front shaft 304A is locked by the multiple front locking parts 306A and the rear shaft 304B is locked by the multiple rear locking parts 306B in a state in which the sheet-shaped member 301 is elastically deformed to extend in the front-rear direction.

A pad 307 is provided on the upper portion of the seat cushion frame 31. The pad 307 is made of flexible resin material such as foamed urethane, for example. The sheet-shaped member 301 supports a central part of the pad 307 from below.

A sensor 309 is provided on the upper portion of the seat cushion 2. Specifically, the sensor 309 is disposed between the upper surface of the pad 307 constituting the seat cushion 2 and the skin member 308. The sensor 309 is a load sensor for detecting a load. For example, the sensor 309 may be a piezoelectric element, a membrane switch that deforms according to the load so that contacts are closed, or the like. The sensor 309 is provided to detect whether there is an occupant seated on the seat cushion 2. In the present embodiment, the sensor 309 is a membrane switch outputs an ON signal when a load greater than or equal to a predetermined value is applied. The sensor 309 is connected to the electronic control unit 42 via a sensor harness 310, The pad 307 has a first harness hole 311 that vertically penetrates therethrough. The sheet-shaped member 301 has a second harness hole 312 that vertically penetrates therethrough. A grommet 314 is fitted on an edge part of the second harness hole 312. The sensor harness 310 extending from the sensor 309 passes through the first harness hole 311 and the second harness hole 312 to extend to below the sheet-shaped member 301. Preferably, the first harness hole 311 and the second harness hole 312 are disposed in positions overlapping each other as seen from above. Namely, the first harness hole 311 and the second harness hole 312 are preferably in communication with each other. Also, in a case where the first harness hole 311 and the second harness hole 312 are disposed to be offset from each other as seen from above, it is preferred that a harness reception groove 307A extending from the first harness hole 311 to the second harness hole 312 is formed in the bottom surface of the pad 307. The harness reception groove 307A receives the sensor harness 310 which extends from the first harness hole 311 to the second harness hole 312.

The sensor harness 310 which extends downward from the second harness hole 312 extends along the base cross member 13 (213) toward the reclining drive unit 61. The sensor harness 310 is joined to the base cross member 13 (213) at one or more parts by means of resin fastener(s) 69 or the like. Also, a part of the sensor harness 310 is tied up together with the second harness 67. The sensor harness 310 extends together with the second harness 67 to the lower member 19 (219) and thereafter extends to the electronic control unit 42.

Figure 22:
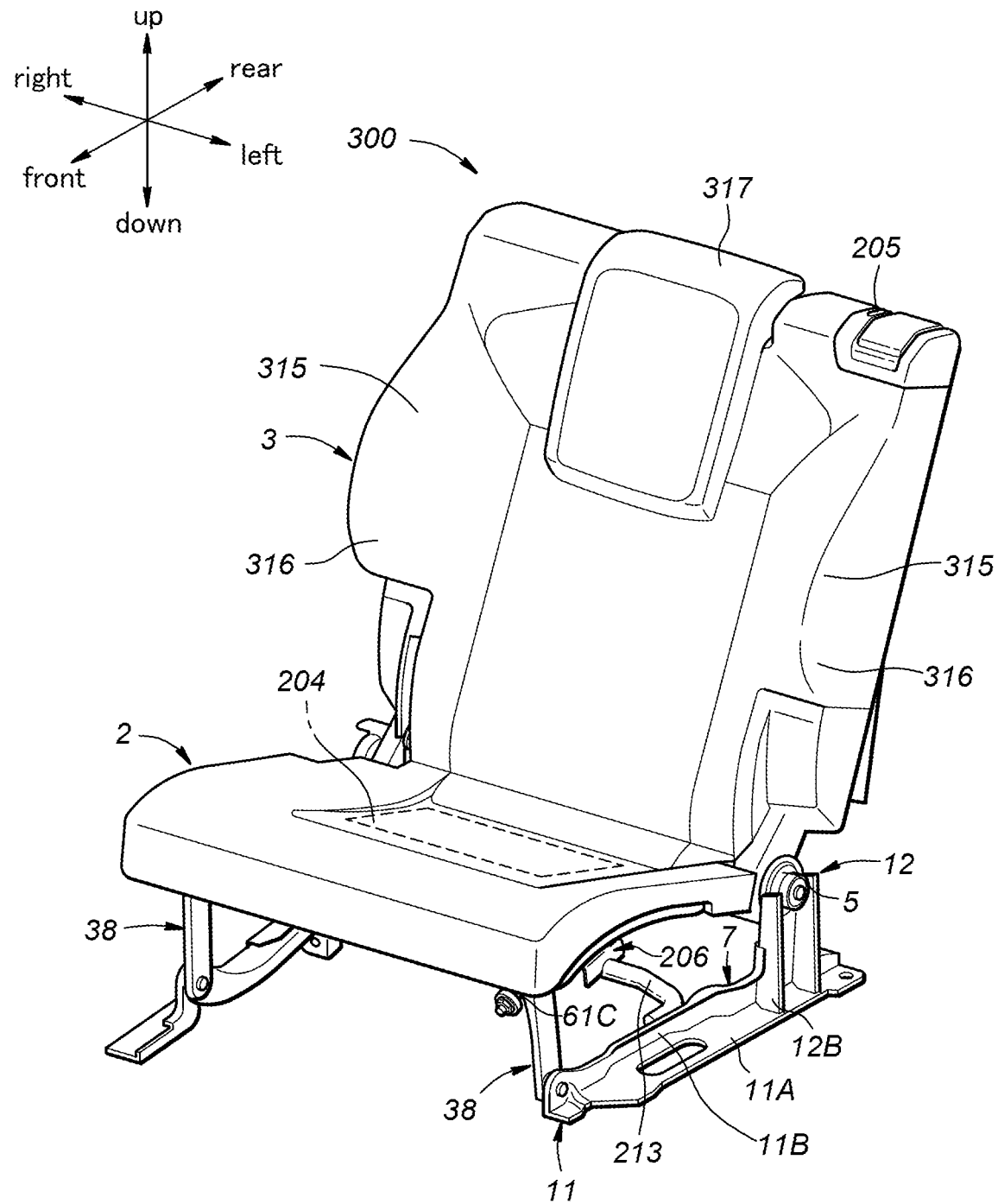
FIG. 22 is a perspective view of a seat according to the third embodiment.

As shown in FIG. 22, the vehicle seat 300 includes a restricting part 315 that protrudes forward from the seat back 3 when the vehicle seat 300 is in the use position. The restricting part 315 restricts the load applied from the seat back 3 to the sensor 309 to be less than or equal to a predetermined value when the vehicle seat 300 is in the stowed position. Preferably, the restricting part 315 is constituted of the pad 307 and the skin member 308 covering the pad 307 such that the restricting part 315 is integral with the seat back 3.

For example, the restricting part 315 preferably includes side supporting parts 316 provided on the left and right side portions of the seat back 3. The left and right side supporting parts 316 protrude forward from the left and right side portions of the front surface of the seat back 3. Namely, parts of the front surface of the seat back 3 provided with the left and right side supporting parts 316 protrude forward relative to the laterally central part of the seat back 3. The left and right side supporting parts 316 extend vertically. When the vehicle seat 300 is in the stowed position, the left and right side supporting parts 316 contact the left and right side portions of the seat cushion 2, whereby a gap is formed between the laterally central part of the seat back 3 and the upper surface of the seat cushion 2. This prevents a load from being applied to the sensor 309. Therefore, erroneous detection by the sensor 309 due to the load from the seat back 3 can be prevented.

The restricting part 315 may include a headrest 317 provided on the upper portion of the seat back 3, for example. Preferably, the lower portion of the headrest 317 is disposed above the front surface of the seat back 3. Namely, the headrest 317 includes a part disposed more forward than the front surface of the seat back 3. When the vehicle seat 300 is in the stowed position, the headrest 317 contacts the front portion of the seat cushion 2, whereby a gap is formed between the front surface of the seat back 3 and the upper surface of the seat cushion 2. This prevents a load from being applied to the sensor 309. Therefore, erroneous detection by the sensor 309 due to the load from the seat back 3 can he prevented.

Since the vehicle seat 300 according to the third embodiment includes the sheet-shaped member 301 having flexibility, the seat cushion 2 can provide the occupant with a soft feeling. Since the sheet-shaped member 301 is provided with the second harness hole 312, the sensor harness 310 extending from the sensor 309 can extend to below the sheet-shaped member 301 without interfering with the sheet-shaped member 301. Further, the grommet 314 fitted on the edge part of the second harness hole 312 can prevent the edge part of the second harness hole 312 from being damaged due to contact with the sensor harness 310. The provision of the grommet 314 can also prevent the sensor harness 310 from being damaged due to contact with the edge part of the second harness hole 312.

The seat cushion 2 of the vehicle seat 300 according to the third embodiment is preferably manufactured by a manufacturing method that includes a step of providing the sheet-shaped member 301 to extend between the front member 33 and the rear member 34 and a step of causing the pad 307 provided with the sensor 309 to be supported on the seat cushion frame 31 and the sheet-shaped member 301.

A vehicle seat 400 according to the fourth embodiment differs from the vehicle seat 300 according to the third embodiment with respect to the arrangement of the sensor harness 310 below the seat cushion 2. Also, the vehicle seat 400 does not have the second harness hole 312.

As shown in FIG. 23, the sensor harness 310 reaches the upper surface of the sheet-shaped member 301 by passing through the first harness hole 311 and thereafter reaches the side edge of the sheet-shaped member 301 by passing between the pad 307 and the sheet-shaped member 301. Preferably, the bottom surface of the pad 307 is formed with a harness reception groove 307A extending from the first harness hole 311 to at least one of the cushion side members 32, and the sensor harness 310 is disposed in the harness reception groove 307A. Thereafter, the sensor harness 310 passes a space between the sheet-shaped member 301 and one of the left and right cushion side members 32 to extend downward. Thereafter, the sensor harness 310 extends along the base cross member 13 (213) toward the reclining drive unit 61. The sensor harness 310 is joined to the base cross member 13 (213) at one or more parts by means of resin fastener(s) 69 or the like. Also, a part of the sensor harness 310 is tied up together with the second harness 67. The sensor harness 310 extends together with the second harness 67 to the lower member 19 (219) and thereafter extends to the electronic control unit 42.

Preferably, a cover 418 made of resin and extending in the front-rear direction is fitted on the cushion side member 32. The cover 418 is provided on at least a laterally inner side surface 32A of the cushion side member 32. The cover 418 includes an upper surface part 418A that faces vertically and a depending part 418B that extends downward from the upper surface part 418A along the cushion side member 32. The cover 418 includes a convex boss (not shown in the drawings) that protrudes from the back side of the depending part 418B and contacts the inner side surface 32A at the tip thereof. Preferably, the sensor harness 310 extends downward from the side edge of the sheet-shaped member 301 by passing through the space between the side edge of the sheet-shaped member 301 and the cover 418 that laterally oppose each other. Because the sensor harness 310 passes between the lower surface of the pad 307 and the upper surface of the sheet-shaped member 301, the second harness hole 312 can be omitted from the sheet-shaped member 301. The omission of the second harness hole 312 from the sheet-shaped member 301 can improve the tensile strength of the sheet-shaped member 301. Also, due to the cover 418 provided on the cushion side member 32, contact between the sensor harness 310 and the cushion side member 32 can be avoided, and wear of the sensor harness 310 can be suppressed.

A vehicle seat 500 according to the fifth embodiment differs from the third embodiment with respect to the structure of the seat cushion frame 31 and the sheet-shaped member 301. Also, the seat cushion 2 includes a support member 319. In the following description, only the configuration that differs will be explained, and explanation will be omitted regarding the configuration same as that of the vehicle seat 300 according to the third embodiment, for which the foregoing description should be referred to.

Figure 25:
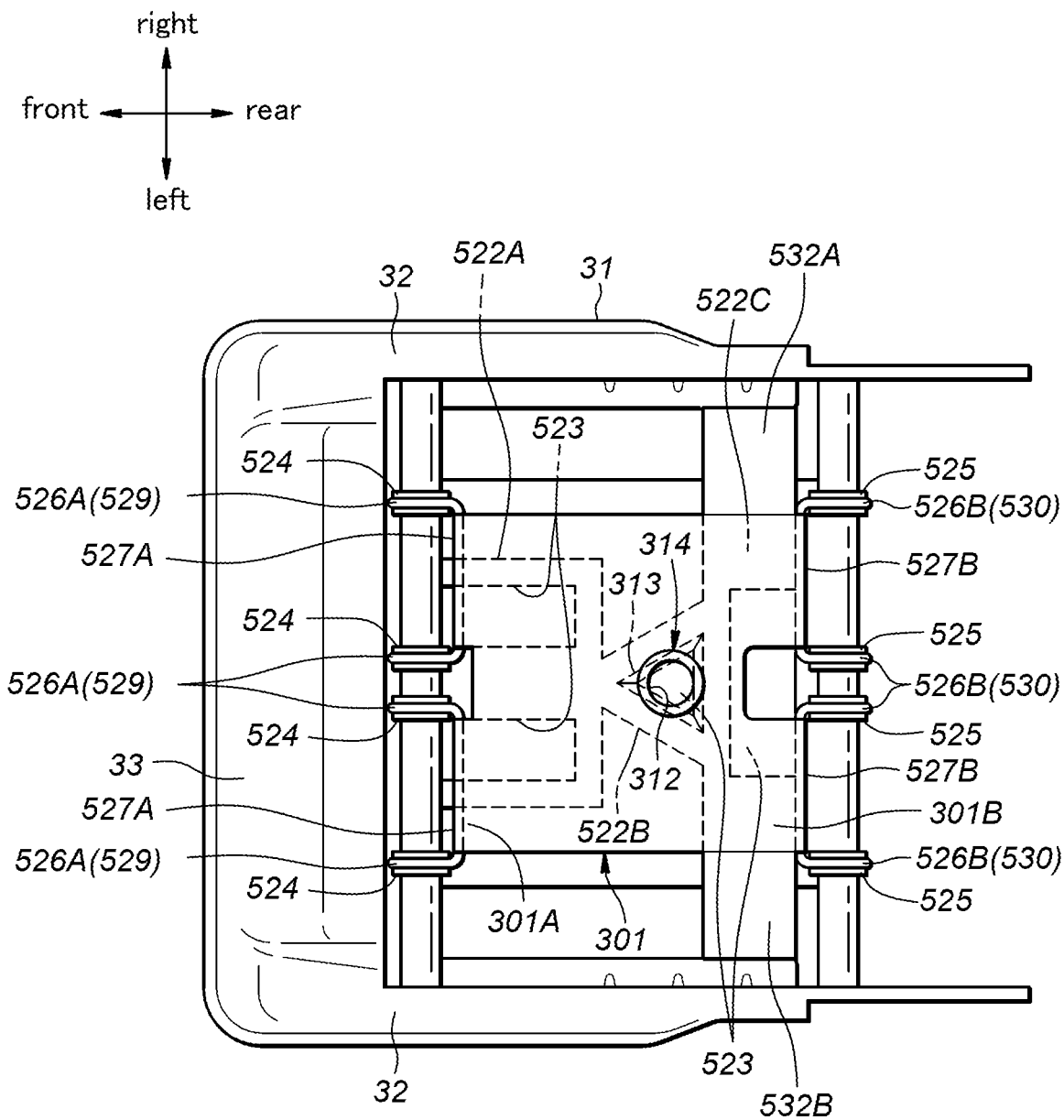
FIG. 25 is a plan view of an inside of a seat cushion according to the fifth embodiment.

As shown in FIG. 25, the vehicle seat 500 includes a middle member 520 behind the front member 33. The middle member 520 extends laterally behind the front member 33 and is joined to the left and right cushion side members 32. Preferably, the middle member 520 is formed of a pipe member having a circular cross section, for example. Similarly, a rear member 521 is preferably formed of a pipe member having a circular cross section.

Figure 24:
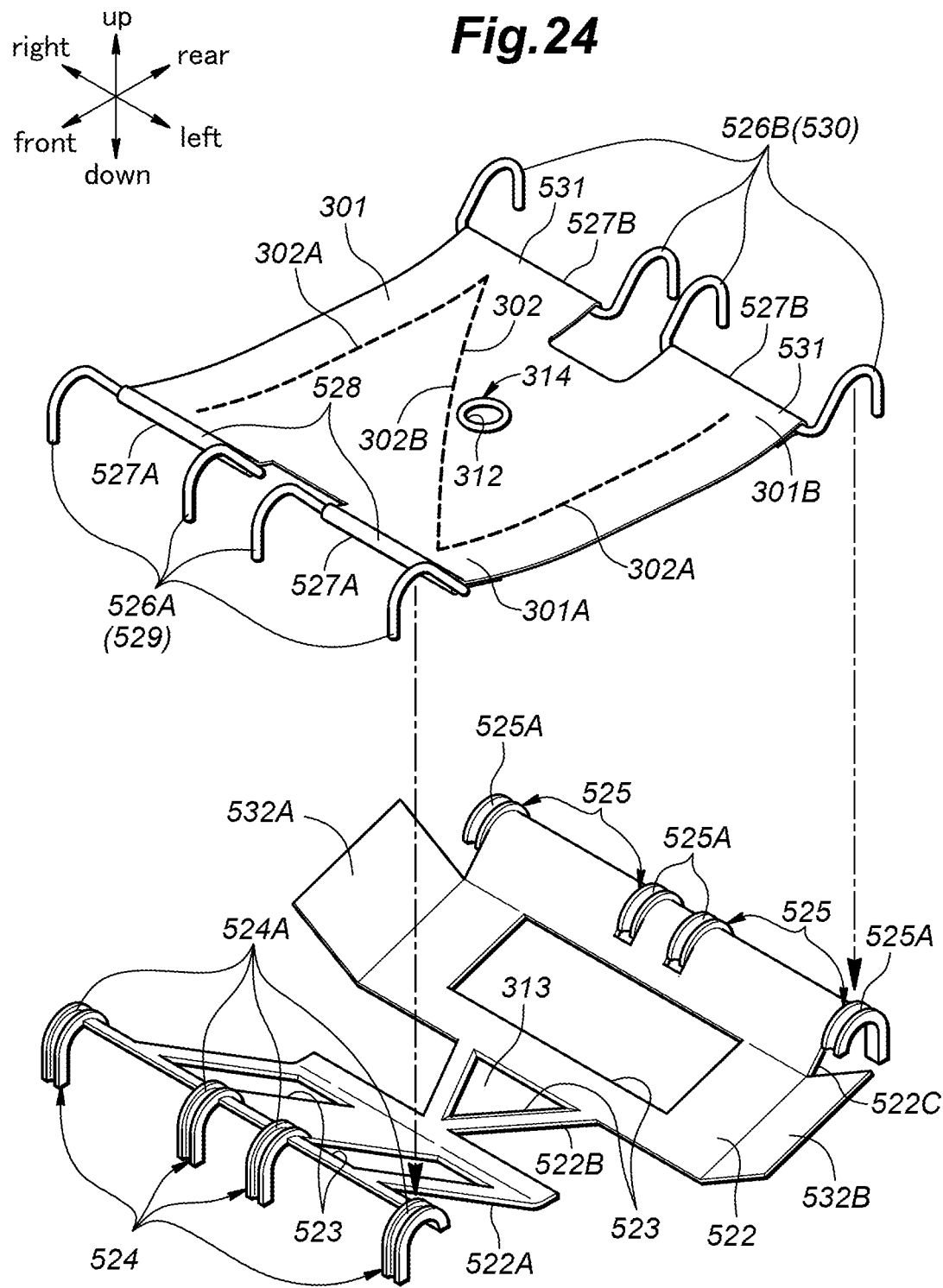
FIG. 24 is a perspective view showing a sheet-shaped member and a support member according to the fifth embodiment.
Figure 26:
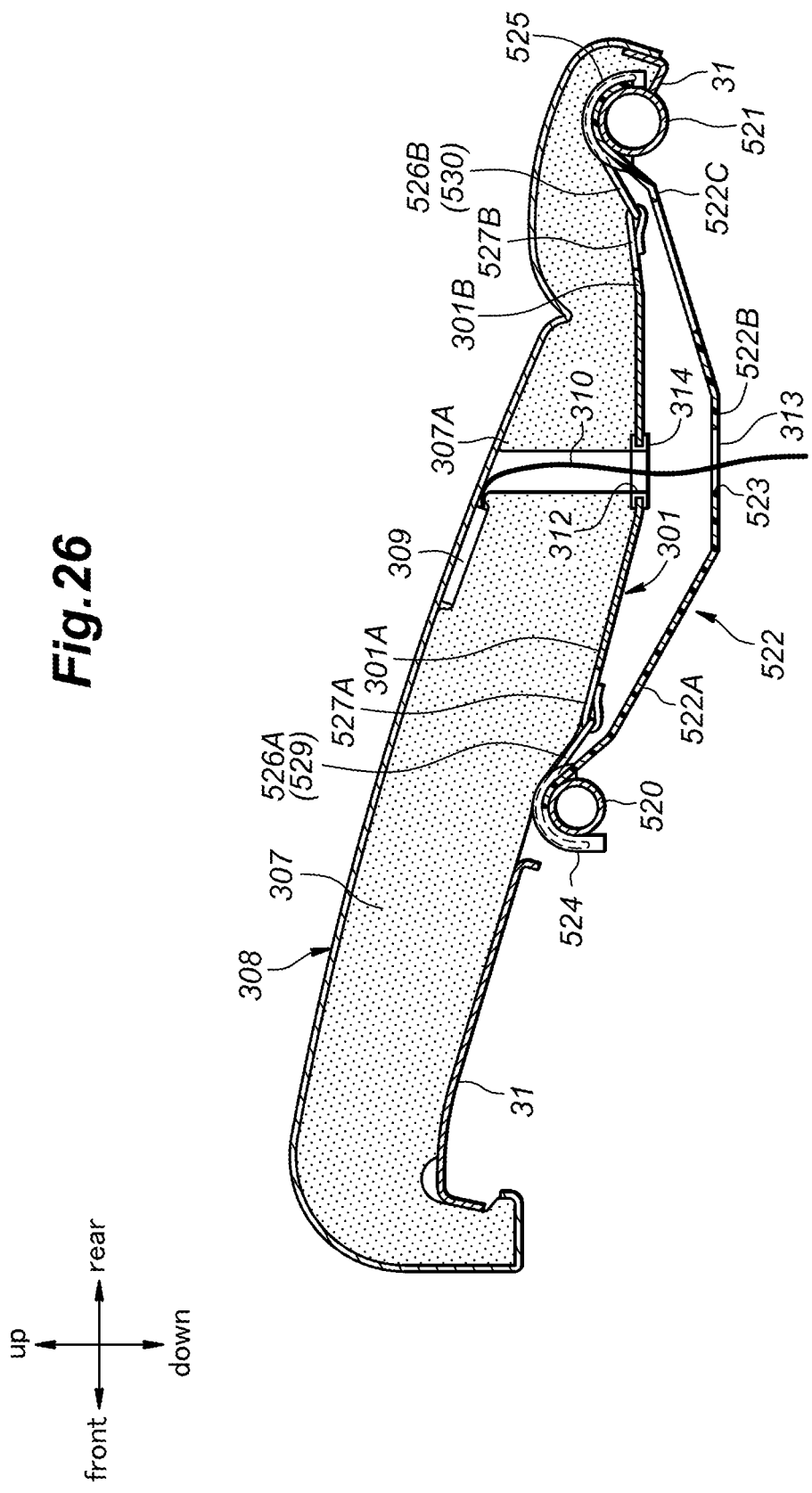
FIG. 26 is a sectional view of the seat cushion according to the fifth embodiment.

As shown in FIGS. 24 to 26, the vehicle seat 500 includes a support member 522. The support member 522 extends in the front-rear direction to span between the middle member 520 and the rear member 521. The support member 522 has a vertically facing surface and the front edge and the rear edge thereof extend laterally. The support member 522 has flexibility and is formed of resin, for example. The support member 522 includes, in order from the front side, a front portion 522A, an intermediate portion 522B, and a rear portion 522C. The support member 522 is supported by the middle member 520 at the front portion 522A and is supported by the rear member 521 at the rear portion 522C. The intermediate portion 522B extends substantially horizontally, the front portion 522A extends from the intermediate portion 522B forward and upward toward the front member 33, and the rear portion 522C extends from the intermediate portion 522B rearward and upward toward the rear member 521. Preferably, the lateral width of the intermediate portion 522B is set smaller than the lateral width of each of the front portion 522A and the rear portion 522C. in the present embodiment, the intermediate portion 522B is formed in a triangular shape with the lateral width decreasing forward. Also, each of the front portion 522A and the rear portion 522C is formed in a substantially rectangular shape. The lateral width of the front portion 522A is formed smaller than the lateral width of the rear portion 522C. Preferably, each of the front portion 522A, the intermediate portion 522B, and the rear portion 522C is formed with at least one lightening hole 523. The shapes of the front portion 522A, the intermediate portion 522B, the rear portion 522C, and the lightening hole 523 may be set arbitrarily.

The right part of the rear portion 522C is provided with a right extension piece 532A that extends rightward and upward from the right edge of the rear portion 522C. The left part of the rear portion 522C is provided with a left extension piece 532B that extends leftward and upward from the left edge of the rear portion 522C. The right extension piece 532A and the left extension piece 532B are disposed to overlap with the rear portions of the cushion side members 32 from above. At this time, the sensor harness 310 preferably passes through the second harness hole 312 to prevent damage due to contact with the right extension piece 532A and the left extension piece 532B.

The front edge of the front portion 522A of the support member 522 is provided with multiple first hook parts 524 for engaging with the middle member 520. Each of the first hook parts 524 is formed in a semi-circular shape that opens downward as seen in the lateral direction. The rear edge of the rear portion 522C of the support member 522 is provided with second hook parts 525 for engaging with the rear member 521. The second hook parts 525 extend laterally along the rear edge of the rear portion 522C of the support member 522. Each second hook part 525 is formed in a semi-circular shape that opens downward as seen in the lateral direction. With the multiple first hook parts 524 engaging with the middle member 520 and the second hook parts 525 engaging with the rear member 521, the support member 522 is disposed to span between the middle member 520 and the rear member 521.

Also, a sheet-shaped member 301 is disposed to span between the middle member 520 and the rear member 521. The front edge 301A of the sheet-shaped member 301 is provided with at least one front locking part 526A. The front locking part 526A is formed by bending a metal rod. Multiple front loop parts 527A are formed by folding back and suturing the front edge 301A of the sheet-shaped member 301. Each front loop part 527A extends laterally. The front locking part 526A includes a shaft part 528 pivotably supported on the front loop part 527A and left and right third hook parts 529 extending forward from the both ends of the shaft part 528. Each third hook part 529 is formed in a semi-circular shape that opens downward as seen in the lateral direction.

The rear edge 301B of the sheet-shaped member 301 is provided with at least one rear locking part 526B. The rear locking part 526B is formed by bending a metal rod. Multiple rear loop parts 527B are formed by folding back and suturing the rear edge 301B of the sheet-shaped member 301. Each rear loop part 527B extends laterally. The rear locking part 526B includes a shaft part 531 pivotably supported on the rear loop part 527B and left and right fourth hook parts 530 extending forward from the both ends of the shaft part 531. Each fourth hook part 530 is formed in a semi-circular shape that opens downward as seen in the lateral direction.

The front locking part 526A of the sheet-shaped member 301 is locked to the first hook part 524 of the support member 522, and is locked to the middle member 520 via the first hook part 524. The upper surface of the first hook part 524 of the support member 522 is formed with a front engagement groove 524A for receiving the third hook part 529. The front engagement groove 524A extends in the front-rear direction along the upper surface of the first hook part 524. With each third hook part 529 being fitted in the corresponding front engagement groove 524A, the position of the front locking part 526A in the lateral direction relative to the first hook part 524 is determined.

The rear locking part 526B of the sheet-shaped member 301 is locked to the second hook part 525 of the support member 522, and is locked to the rear member 521 via the second hook part 525. The upper surface of the second hook part 525 of the support member 522 is formed with a rear engagement groove 525A for receiving the fourth hook part 530. The rear engagement groove 525A extends in the front-rear direction along the upper surface of the second hook part 525. With each fourth hook part 530 being fitted in the corresponding rear engagement groove 525A, the position of the rear locking part 526B in the lateral direction relative to the second hook part 525 is determined.

In a state in which no load is applied to the upper surface of the seat cushion 2, the central part 301C of the sheet-shaped member 301 in the front-rear direction is in a position spaced from the central part 522D of the support member 522. As the load applied to the upper surface of the seat cushion 2 becomes large, the sheet-shaped member 301 flexes downward and the sheet-shaped member 301 is supported on the upper surface of the support member 522.

Preferably, the lightening hole 523 of the support member 522 is arranged in a position overlapping with the second harness hole 312 of the sheet-shaped member 301 as seen in the up-down direction. Thereby, the sensor harness 310 passing through the second harness hole 312 downward is allowed to extend through the lightening hole 523 to below the support member 522. Namely, the lightening hole 523 functions as a harness hole for allowing the sensor harness 510 to pass therethrough.

Due to the support member 522 that supports the sheet-shaped member 301, it is possible to increase the load that can be supported by the seat cushion 2. Since the support member 522 is provided with the lightening hole 523, arrangement of the sensor harness 310 is easy.

Figure 27:
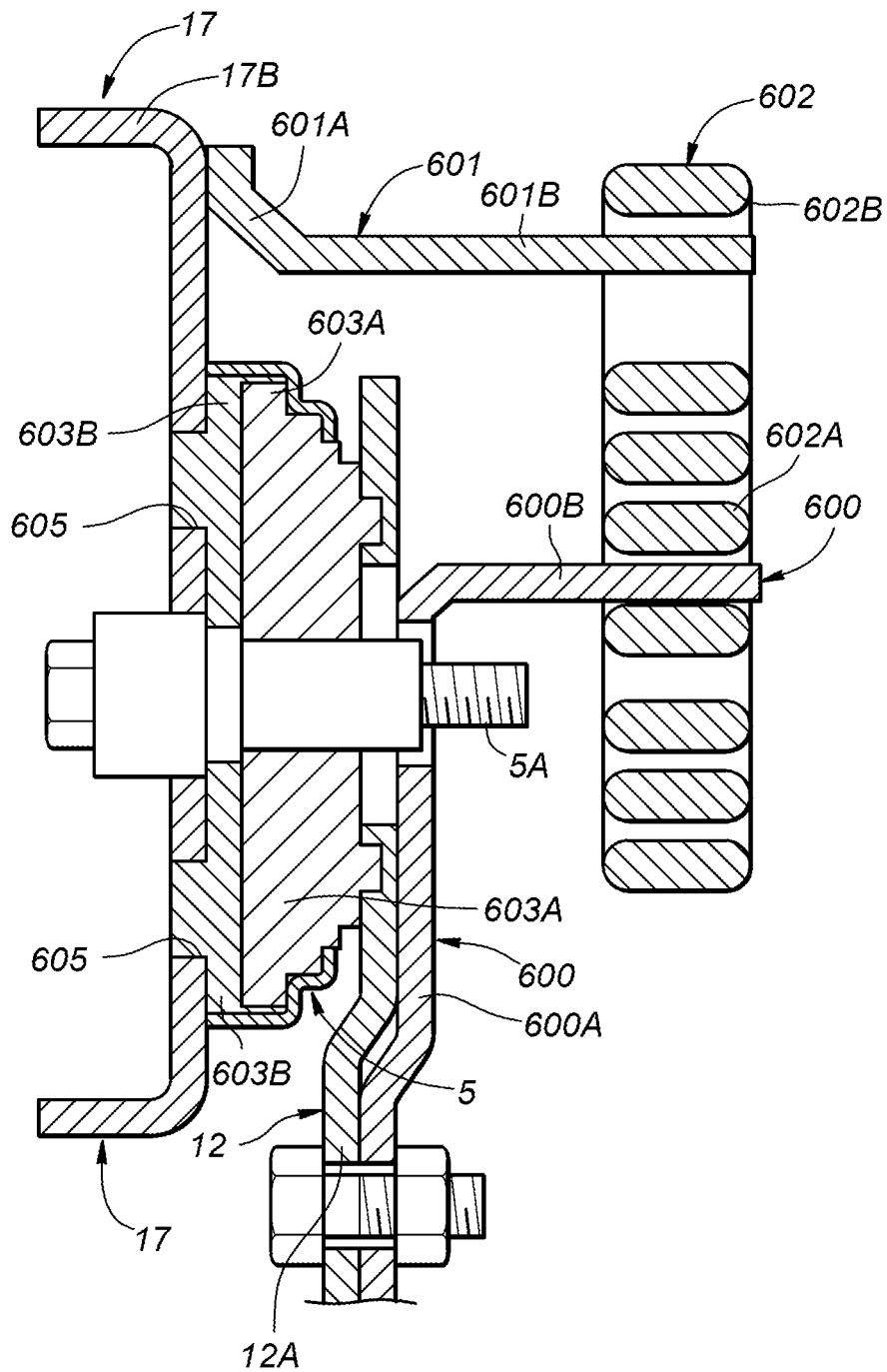
FIG. 27 is a sectional view of a lock device and a structure around it.

As shown in FIG. 27, a first hook bracket 600 is provided on the pillar main body 12A of the base pillar 12. The first hook bracket 600 is formed of a sheet metal member and has a laterally facing base portion 600A. The base portion 600A extends along the outer side surface of the pillar main body 12A and is joined to the pillar main body 12A. The first hook bracket 600 includes a protruding portion 600B that protrudes laterally outward from one end of the base portion 600A.

A second hook bracket 601 formed of a sheet metal member is provided on the side member lower portion 17B of the back side members 17. The second hook bracket 601 includes a base portion 601A joined along the outer side surface of the side member lower portion 17B and a protruding portion 601B that extends laterally outward from the base portion 601A. The tip of the protruding portion 601B is disposed above the protruding portion 600B.

A spiral spring 602 is provided laterally outside of the pillar main body 12A, One end 602A of the spiral spring 602, which is at the center of the spiral spring 602, is supported on the protruding portion 600B, and the other end 602B of the spiral spring 602, which is at the outer side of the spiral spring 602, is supported on the protruding portion 601B. The spiral spring 602 urges the seat back frame 16 relative to the base pillar 12 counterclockwise as seen from the left.

Next, a procedure for assembling the lock device 5 and the structure around it will be described. The worker couples each base pillar 12 to the seat back frame 16 via the lock device 5. Specifically, the worker connects the first part 603A to the pillar main body 12A and connects the second part 603B to the side member lower portion 17B. Thereby, the base pillar 12 and the seat back frame 16 are rotatable coupled via the lock device 5.

Figure 28:
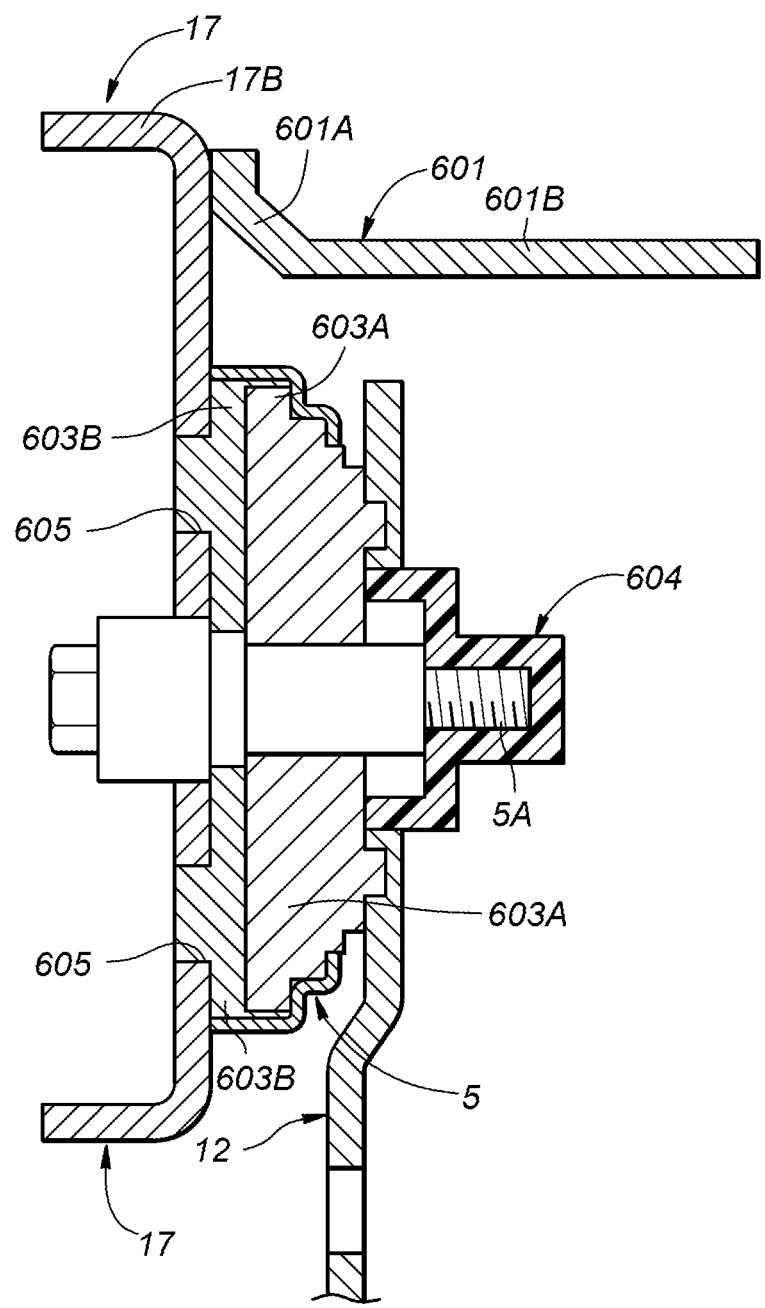
FIG. 28 is a sectional view of the lock device and the structure around it.

Next, as shown in FIG. 28, the worker attaches a cap 604 in the lateral direction to cover the operation shaft 5A exposed laterally outward from the pillar main body 12A as well as a gap 605 formed between the first part 603A and the operation shaft 5A. The cap 604 is formed in a tubular shape, and one end of the cap 604 is in close contact with the first part 603A. The cap 604 is made f resin, for example. Next, the worker applies coating on the lock device 5 and the structure around it to prevent rust. Any type of coating may be used so long as it has antirust effect, and in the present embodiment, cationic electrodeposition coating is used. In the cationic electrodeposition coating, the seat back frame 16 including the lock devices 5 and the base pillars 12 are immersed in a water-soluble electrodeposition paint.

Thereby, coating of the seat back frame 16, the base pillars 12, and the lock devices 5 is performed. After the coating is finished, the worker removes the cap 604.

Next, the worker attaches the first hook bracket 600 to each of the left and right base pillars 12. Preferably, the worker performs the attaching in the lateral direction so that the base portion 600A of the first hook bracket 600 extends along the outer side surface of the pillar main body 12A.

Next, the worker attaches the second hook bracket 601 to each of the left and right back side members 17. Preferably, the worker performs the attaching in the lateral direction so that the base portion 601A of the second hook bracket 601 extends along the side member lower portion 17B. The worker may attach the second hook bracket 601 to the side member lower portion 17B before the coating work.

Next, the worker locks the inner-side one end 602A of the spiral spring 602 on the protruding portion 600B of the first hook bracket 600. Lastly, the worker locks the outer-side other end 602B of the spiral spring 602 on the protruding portion 601B of the second hook bracket 601.

Since the first hook bracket 600 is attached after the coating, the cap 604 can be attached before the coating without being interfered by the first hook bracket 600. Due to the cap 604 attached before the coating can, it is possible to prevent the coating liquid from intruding into the inside of the lock device 5 through the gap 605 formed between the first part 603A and the operation shaft 5A during the coating work.

Concrete embodiments have been described in the foregoing, but the present invention is not limited to the above embodiments and may be modified in various ways.

LIST OF REFERENCE NUMERALS

1, 200 vehicle seat
2 seat cushion
3 seat back
4 floor
5 lock device
7 base
13, 213 base cross member
16 seat back frame
17 back side member
18 upper member
19 lower member
21 first cross member
41 lock device drive unit
41A the lock device electric motor
42 electronic control unit
44 first bracket
46 second bracket
61 reclining drive unit
61D reclining electric motor
206 bracket
207 bracket

The invention claimed is:

1. A vehicle seat, comprising:
a base provided on a floor,
a seat back pivotably provided on the base;
a seat cushion pivotably provided on the seat back; and
a reclining drive unit connected to the base and the seat back to make the seat back pivot relative to the base,
wherein the reclining drive unit is disposed more rearward than a front end of the seat cushion,
wherein the base includes left and right base side members extending in a front-rear direction and a base cross member extending laterally and joined to the left and right base side members, and
the reclining drive unit includes a case supported on the base cross member, a nut rotatably supported on the case, a reclining electric motor joined to the case and generating a driving force for rotating the nut, and a screw shaft that is threadingly engaged with the nut, extends in the front-rear direction, and is pivotably connected to the seat back at a rear end thereof.

2. The vehicle seat according to claim 1, wherein the case is joined to the base cross member via a hinge.

3. The vehicle seat according to claim 1, wherein the base cross member is formed of a pipe member having at least one bent part.

4. The vehicle seat according to claim 1, wherein the seat back includes left and right back side members and a lower member extending laterally and joined to the left and right back side members, and
the rear end of the screw shaft is pivotably connected to the lower member.

5. The vehicle seat according to claim 4, wherein the left and right back side members each include a plate-shaped main body having a laterally facing surface and an edge wall portion protruding laterally inward from an edge of the main body, and
the lower member includes a first channel member having a groove-shaped cross section and welded to the edge wall portions at left and right end portions thereof.

6. The vehicle seat according to claim 5, wherein the lower member includes a second channel member having a groove-shaped cross section, disposed inside the first channel member, and joined to the first channel member, and
the rear end of the screw shaft is connected to the first channel member at a position corresponding to the second channel member in a lateral direction.

7. The vehicle seat according to claim 6, wherein the lower member is provided with a bracket that pivotably supports the screw shaft, and
in a state in which the seat back extends vertically, the bracket extends downward and forward from the lower member and supports, at a tip end portion thereof, the rear end of the screw shaft to be pivotable about a laterally extending axis.

8. The vehicle seat according to claim 1, wherein the reclining electric motor is disposed more rearward than the base cross member.

9. The vehicle seat according to claim 1, wherein a rotation shaft of the reclining electric motor extends in a lateral direction, and in plan view, an axis of the screw shaft extends in the front-rear direction.

10. A vehicle seat, comprising:
a base provided on a floor;
a seat back pivotably provided on the base;
a seat cushion pivotably provided on the seat back; and
a reclining drive unit connected to the base and the seat back to make the seat back pivot relative to the base;
a lock device that selectively restricts pivoting of the seat back relative to the floor;
a lock device drive unit that is provided with a lock device electric motor and drives the lock device; and
an electronic control unit that controls the lock device electric motor,
wherein the reclining drive unit is disposed more rearward than a front end of the seat cushion,
the seat back includes a seat back frame, and the lock device drive unit and the electronic control unit are arranged in a vertical direction on one side of the seat back frame in a lateral direction.

11. A manufacturing method of a vehicle seat, comprising:

a step of providing a seat back on a base in a pivotable manner;

a step of providing a seat cushion on the seat back in a pivotable manner; and a step of connecting a reclining drive unit for making the seat back pivot relative to the base to the base and the seat back such that the reclining drive unit is provided more rearward than a front end of the seat cushion, wherein the base includes left and right base side members extending in a front-rear direction and a base cross member extending laterally and joined to the left and right base side members, and the reclining drive unit includes a case supported on the base cross member, a nut rotatably supported on the case, a reclining electric motor joined to the case and generating a driving force for rotating the nut, and a screw shaft that is threadingly engaged with the nut, extends in the front-rear direction, and is pivotably connected to the seat back at a rear end thereof.

* * * * *